(12) United States Patent
Donnellan et al.

(10) Patent No.: US 11,143,506 B2
(45) Date of Patent: Oct. 12, 2021

(54) SYSTEMS AND METHODS FOR DETERMINING A BAROMETRIC PRESSURE BIAS OF A MOBILE DEVICE

(71) Applicant: Verizon Patent and Licensing Inc., Arlington, VA (US)

(72) Inventors: Kevin Donnellan, North Brunswick, NJ (US); Manoj Monga, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 196 days.

(21) Appl. No.: 16/599,846

(22) Filed: Oct. 11, 2019

(65) Prior Publication Data

US 2021/0108918 A1 Apr. 15, 2021

(51) Int. Cl.
*G08B 1/08* (2006.01)
*G01C 5/06* (2006.01)
*H04L 29/08* (2006.01)

(52) U.S. Cl.
CPC ............... *G01C 5/06* (2013.01); *H04L 67/12* (2013.01)

(58) Field of Classification Search
CPC ........ G01C 5/06; H04L 67/12; H04W 64/006; G01S 5/0257
See application file for complete search history.

(56) References Cited

U.S. PATENT DOCUMENTS

| | | | |
|---|---|---|---|
| 9,574,964 B2* | 2/2017 | Melen | G01C 21/26 |
| 9,983,002 B2* | 5/2018 | Jackson | G01C 5/06 |
| 2013/0133421 A1* | 5/2013 | Katz | G01C 5/06 |
| | | | 73/490 |
| 2019/0360804 A1* | 11/2019 | Dormody | G06F 17/18 |

* cited by examiner

*Primary Examiner* — Toan N Pham

(57) ABSTRACT

A device determines, periodically over time, geographic locations of the device. The device receives altitude values that identify altitudes for the geographic locations. The device determines measured barometric pressures for the geographic locations. The device determines expected barometric pressures for the geographic locations based on a reference altitude associated with a reference location, reference barometric pressures associated with the reference location, and the altitudes for the geographic locations. The device determines a barometric pressure bias that is based on respective differences between at least a subset of the expected barometric pressures and a corresponding subset of the measured barometric pressures for the geographic locations. The device performs one or more actions based on the barometric pressure bias.

20 Claims, 14 Drawing Sheets

100 ⟶

| Example Trigger Conditions |
|---|
| • Determine that UE 104 is in motion |
| • Receive request |

110
Determine that trigger condition is satisfied

Inside of vehicle 102

UE
104

| Starting Location (e.g., Fire Station) |
|---|

Vehicle 102
(e.g., fire truck)

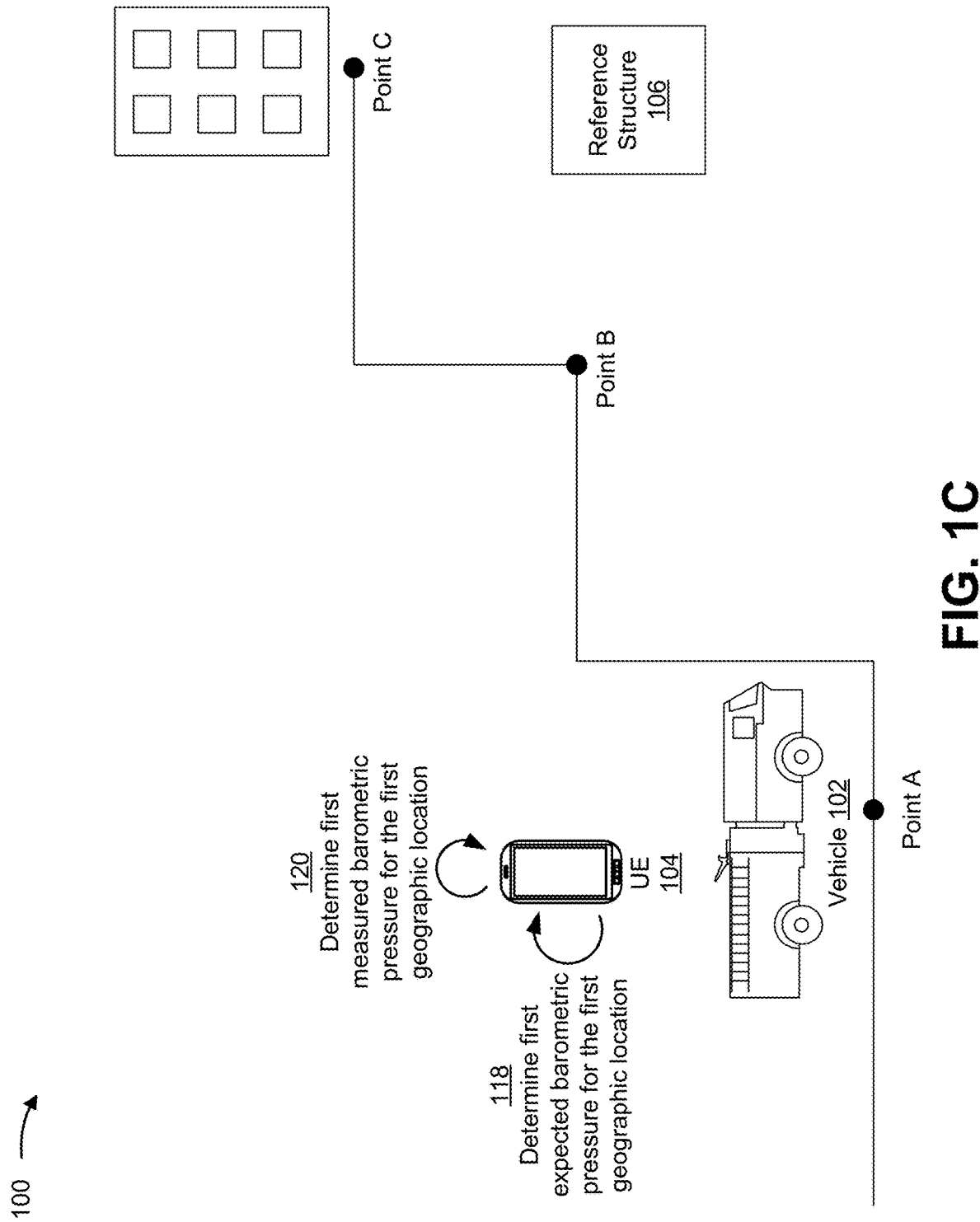

Example Graph Depicting Measured Pressure Readings and Expected Pressure Computations Along Route

US 11,143,506 B2

SYSTEMS AND METHODS FOR DETERMINING A BAROMETRIC PRESSURE BIAS OF A MOBILE DEVICE

BACKGROUND

A mobile device may include one or sensors and/or applications that are used to determine a geographic location of the mobile device. For example, the mobile device may determine a geographic location of the mobile device using a global positioning system (GPS) or a similar type of technology. In some cases, the mobile device may include a barometric pressure sensor that may be used to determine a barometric pressure of a geographic location of the mobile device. In these cases, the barometric pressure may be used to determine a height of the mobile device (e.g., relative to a known position, such as ground level, sea level, and/or the like).

BRIEF DESCRIPTION OF THE DRAWINGS

FIGS. 1A-1I are diagrams of one or more example implementations described herein.

DETAILED DESCRIPTION OF PREFERRED EMBODIMENTS

Figure 1A:
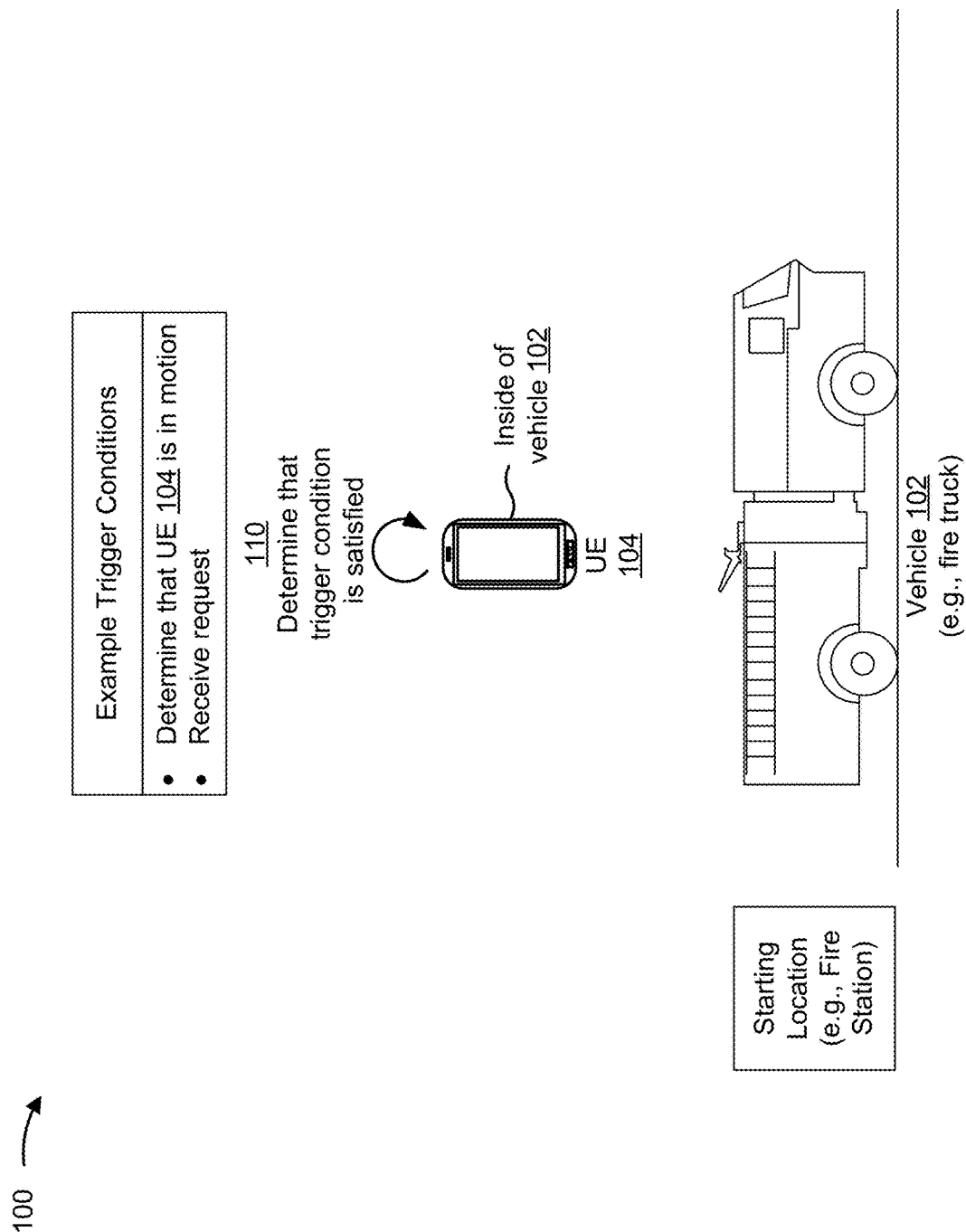

The following detailed description of example implementations refers to the accompanying drawings. The same reference numbers in different drawings may identify the same or similar elements.

A mobile device may include one or more sensors and/or applications that may be used to determine a geographic location of the mobile device. For example, the mobile device may use a global positioning system (GPS) or a similar type of technology to determine a set of geographic coordinates that represent a geographic location of the mobile device. In some cases, the mobile device may use the one or more sensors and/or applications to determine a height of the mobile device (e.g., relative to a known position, such as ground level, sea level, and/or the like). For example, the mobile device may use a barometric pressure sensor to determine a barometric pressure of the geographic location and may use the barometric pressure to determine the height.

However, the barometric pressure sensor will have a bias or a skew that prevents the determined barometric pressure from being able to be used to determine an absolute height. For example, while the determined barometric pressure may be accurate to a certain degree, even a small bias or skew in the determined barometric pressure will cause a large bias or skew when determining the height of the mobile device. Consequently, the height determined by the mobile device may be within a threshold distance of an absolute height (e.g., 3.5 meters), but will not identify the absolute height. In some cases, such as when the determined height is used to identify a floor that the mobile device is on within a building, resources of the mobile device (e.g., processing resources, network resources, and/or the like) may be wasted identifying an incorrect floor.

Furthermore, without the absolute height, the mobile device may be unable to perform one or more useful functions that require an accurate height measurement. For example, a mobile device may be used to assist an initial first responder in performing a rescue operation on a particular floor within a building. In this example, the initial first responder may be tasked with entering the building and assisting individuals that may be trapped on the particular floor of the building. Without the absolute height, the mobile device may be unable to accurately identify and report the particular floor that the mobile device is on inside of the building. Without being able to determine the absolute height, one or more other first responders (e.g., a first responder operating a ladder of a fire truck) may be unable to identify the particular floor that the initial first responder is on within the building, may accidentally provide assistance to the wrong floor of the building, and/or the like. This wastes resources of the mobile device in determining and/or reporting an incorrect floor, resources of devices of the one or more other first responders that perform actions based on the incorrect information, and/or the like.

According to some implementations described herein, a mobile device determines a barometric pressure bias at a particular geographic location and uses the barometric pressure bias to perform one or more actions described herein. For example, the mobile device, while being transported to a destination location, may obtain a set of altitude values that identify a set of altitudes that correspond to the set of geographic locations.

Additionally, mobile device may determine a set of expected barometric pressures that correspond to the set of geographic locations. The set of expected barometric pressures may be determined based on a reference altitude, a set of reference barometric pressures, and the set of altitudes that correspond to the set of geographic locations of the mobile device. The reference altitude may be for a reference location (e.g., a weather station at the reference location may provide data identifying the reference altitude). The set of reference barometric pressures may identify measured barometric pressures at the reference location (e.g., which may also be provided by the weather station). The mobile device may also determine a set of measured barometric pressures that correspond to the set of geographic locations (e.g., using a barometric pressure sensor).

Furthermore, the mobile device may determine a barometric pressure bias that is based on respective differences between at least a subset of the set of expected barometric pressure values and a corresponding subset of the set of measured barometric pressure values. For example, the mobile device may identify the subset of the set of expected barometric pressure values and the corresponding subset of the set of measured barometric pressure values as pressures that are to be used when computing the barometric pressure bias. To identify these pressures, the mobile device may determine that expected barometric pressures and corresponding measured barometric pressures for particular geographic locations satisfy a threshold pressure differential. This may allow the mobile device to use the identified expected and measured barometric pressures when computing the barometric pressure bias.

Additionally, the mobile device may perform one or more actions based on the barometric pressure bias. For example, the mobile device may use the barometric pressure bias to recalibrate the barometric pressure sensor (e.g., to improve measured barometric pressures determined by the sensor), to determine a height of the mobile device and/or a floor of the mobile device within the destination location, and/or the like.

By determining the barometric pressure bias at the destination location, the mobile device is able to efficiently, effectively, and/or accurately measure barometric pressures at specific locations within the destination location (e.g., while the mobile device is moving within a structure located at the destination location). For example, the mobile device may use the barometric pressure bias to accurately measure a barometric pressure at a specific location within the destination (e.g., such that the barometric pressure bias offsets any bias or skew caused by the barometric pressure sensor of the mobile device). By accurately measuring barometric pressures, the mobile device is able to determine accurate heights of the mobile device at the specific locations (e.g., relative to determining heights without the barometric pressure bias), to determine accurate floors that the mobile device is located on within the structure located at the destination location (e.g., relative to determining the floors using an inaccurate measured barometric pressure), and/or the like. Furthermore, in this way, the mobile device conserves resources (e.g., processing resources, network resources, memory resources, and/or the like) that would be wasted determining inaccurate barometric pressures (e.g., that are not adjusted based on the barometric pressure bias), conserves resources that would be wasted determining inaccurate heights (e.g., that are based on measured barometric pressures that have not been adjusted based on the barometric pressure bias), conserves resources that would be wasted determining inaccurate floors, conserves resources of the mobile device and/or one or more other devices that would be wasted performing one or more actions based on inaccurate data, and/or the like.

FIGS. 1A-1I are diagrams of one or more example implementations 100 described herein. Example implementation(s) 100 may include a vehicle 102 (e.g., a fire truck), a user equipment (UE) 104, and a reference structure 106 (e.g., a weather station). As shown in FIGS. 1A-1I, UE 104 may determine a barometric pressure bias of UE 104 at a destination location and may use the barometric pressure bias to determine a height of UE 104 at particular geographic locations within the destination location. While one or more example implementations herein use the barometric pressure bias and/or the height of UE 104 to perform actions associated with a team of first responders that are responding to a distress call, it is to be understood that this is provided by way of example, In practice, the barometric pressure bias and/or the height of UE 104 may be used to perform actions in other contexts, such as actions related to other weather measurements and/or forecasts, actions relating to tasks performed in a lab, actions relating to tasks performed in a kitchen, actions relating to distance calculations, actions relating to aerial vehicles, and/or the like.

As shown in FIG. 1A, and by reference number 110, UE 104 may determine that a trigger condition is satisfied. For example, UE 104 may be configured with a set of trigger conditions that, when satisfied, cause UE 104 to use a barometric pressure management application to determine the barometric pressure bias. The barometric pressure management application may include a set of functions used to determine the barometric pressure bias at the destination location, to use the barometric pressure bias to determine adjusted measured barometric pressures at geographic locations within and/or near the destination location, to perform one or more actions based on the adjusted barometric pressures, and/or the like.

A trigger condition may be a detectable event that causes UE 104 to launch the barometric pressure management application, that causes UE 104 to execute one or more functions used to determine the barometric pressure bias, and/or the like. The set of trigger conditions may include a first trigger condition that is satisfied based on a speed of UE 104 satisfying a threshold speed, a second trigger condition that is satisfied based on a user submitting a request, and/or the like, as described below.

In some implementations, UE 104 may determine that the first trigger condition has been satisfied. For example, UE 104 may include a motion sensor, such as an accelerometer, that periodically measures a speed of UE 104. In this case, UE 104 may periodically compare a speed of UE 104 and a threshold speed and may determine that the first trigger condition is satisfied based on the speed satisfying the threshold speed. In other cases, UE 104 may measure the speed using another type of motion sensor, an application capable of determining the speed, and/or the like. In the example shown, UE 104 may be a mobile device of a first responder who is tasked with traveling to the destination location to respond to a distress call. In this example, when the first responder begins walking to vehicle 102 and/or when vehicle 102 begins to leave the fire station, UE 104 may detect that UE 104 is in motion (e.g., using the accelerometer) and may determine that the first trigger condition is satisfied based on comparing a speed measured by the accelerometer and the threshold speed.

In some implementations, UE 104 may determine that the second trigger condition has been satisfied. For example, a user (e.g., the first responder) may launch the barometric pressure management application and may interact with an interface of the application to submit a request to determine the barometric pressure bias at the destination location, to periodically determine the height of UE 104 after arriving at the destination location, to perform one or more actions based on the barometric pressure bias and/or the height of UE 104, and/or the like. In this case, the request may cause the second trigger condition to be satisfied which may in turn cause the barometric pressure management application to execute particular functions needed to satisfy the request.

Additionally, or alternatively, and provided as another example, UE 104 may determine that the second trigger condition has been satisfied based on receiving a request from another device. For example, an application used to manage distress calls for first responders may be configured such that receipt of a distress call might cause the application to interact with the barometric pressure management application to submit a request. This may cause the barometric pressure management application to execute particular functions needed to satisfy the request.

It is to be understood that the first and second trigger conditions are provided by way of example, and that in practice, one or more other trigger conditions may be implemented. For example, UE 104 may be configured with a third trigger condition that is satisfied when a present time period matches a configured time period, when a threshold quantity of time has passed, and/or the like.

In this way, UE 104 determines that the trigger condition has been satisfied and is able to execute functions needed to determine the barometric pressure bias (e.g., which may be used to determine one or more adjusted measured barometric pressures of UE 104 at the geographic locations within the destination location, to determine one or more heights of UE 104 at the geographic locations, and/or the like).

Figure 1B:
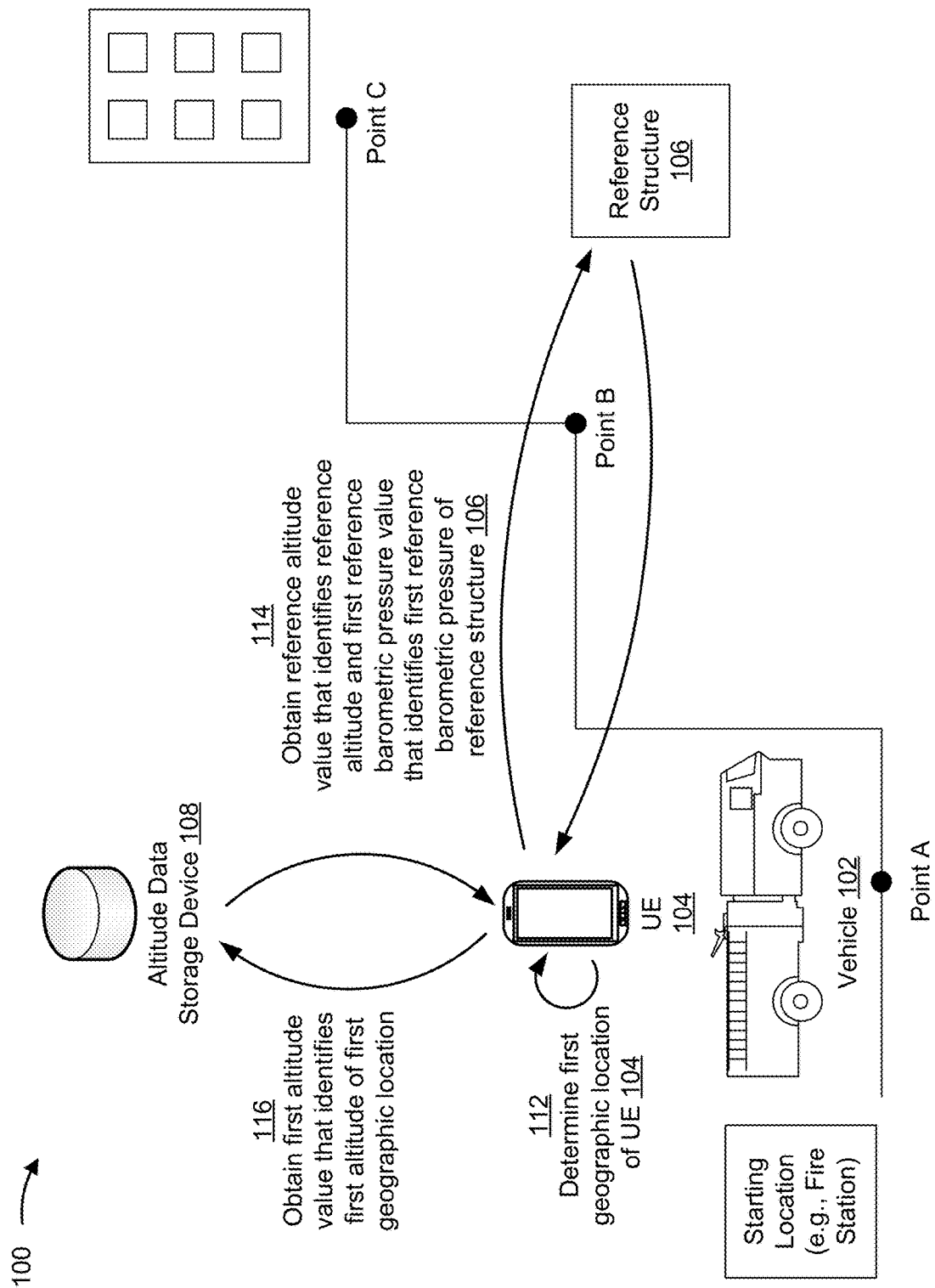

As shown in FIG. 1B, and by reference number 112, UE 104 may determine a first geographic location of UE 104 (shown as Point A). For example, UE 104 may, based on determining that the trigger condition has been satisfied, use a global positioning system (GPS) technology and/or a similar type of technology to determine the first geographic location of UE 104.

In some implementations, UE 104 may be configured to periodically determine geographic locations of UE 104 based on the trigger condition being satisfied. For example, UE 104 may be configured to determine a geographic location of UE 104 at set time periods and/or at set time intervals. This may allow UE 104 to determine altitudes and barometric pressures at each respective geographic location, which will be used to determine the barometric pressure bias at the destination location, as will be described further herein. In some cases, such as when UE 104 may be required to remain at a particular geographic location until the trigger condition is satisfied, UE 104 may be configured with location data that identifies the first geographic location. As a specific example, if UE 104 is required to remain at the fire station until a distress call has been received, UE 104 may be configured with location data that identifies the first geographic location.

As shown by reference number 114, UE 104 may obtain a reference altitude value that identifies a reference altitude and a first reference barometric pressure value that identifies a first reference barometric pressure of reference structure 106 (e.g., the weather station). For example, UE 104 may obtain a reference altitude value and a first reference barometric pressure value that are to be used to determine an expected barometric pressure for the first geographic location (as will be described in connection with FIG. 1C). The reference altitude may correspond to a particular geographic location associated with reference structure 106. The first reference barometric pressure may identify a first measured barometric pressure at the particular geographic location associated with reference structure 106.

One or more reference measurements (e.g., the reference altitude, the first reference barometric pressure, and/or the like) will affect an expected barometric pressure determined in FIG. 1C. Furthermore, changes in weather will cause changes in barometric pressure. Consequently, when determining the expected barometric pressure at a given location (e.g., the first geographic location), UE 104 may consider a measured barometric pressure (e.g., the first reference barometric pressure) of reference structure 106. Furthermore, a change in altitude between two geographic locations may affect the expected pressure. Consequently, a difference between an altitude of reference structure 106 and a present altitude of UE 104 (e.g., a current location of UE 104) will be considered when determining the expected barometric pressure for the first geographic location.

In some implementations, to obtain the one or more reference measurements, UE 104 may submit a request for reference measurement data to a device associated with reference structure 106. For example, UE 104 and the device associated with reference structure 106 may be capable of communicating via an interface (e.g., an application programming interface (API) or another type of communication interface). In this case, UE 104 may use the interface to submit the request for the reference measurement data. This may cause the device associated with reference structure 106 to use the interface to provide UE 104 with a response that includes the reference measurement data.

To provide a specific example, UE 104 may use an API to provide, to a server within a weather station, a request for reference measurement data. In this example, the server may determine a reference altitude and a reference measured barometric pressure for a particular location of the reference weather station. The server may then provide, to UE 104, a reference altitude value that identifies the reference altitude for the weather station and a reference measured barometric pressure value that identifies the reference measured barometric pressure for the weather station.

In some implementations, reference structure 106 may be a structure that is within a threshold distance of a target structure (e.g., a fire department), of vehicle 102, of UE 104, and/or the like. For example, the accuracy of expected barometric pressures determined by UE 104 will be higher as UE 104 is closer to reference structure 106. Consequently, UE 104 (e.g., using the barometric pressure management application) may be configured with a rule that specifies that reference structure 106 may be eligible to provide reference measurements to UE 104 only if reference structure 106 is within a threshold distance of UE 104.

As shown by reference number 116, UE 104 may obtain a first altitude value that identifies a first altitude of the first geographic location. For example, to be able to determine expected pressure at the first geographic location, UE 104 may first need to identify altitude for the first geographic location. In this case, UE 104 may use another interface (another API or another type of communication interface) to obtain, from altitude data storage device 108, the first altitude value that identifies the first altitude of the first geographic location. The first altitude may represent a measured altitude and/or a known altitude for the first geographic location.

To provide a specific example, UE 104 may use an API to provide, to a server with access to altitude data (e.g., a server hosted by the United States Geological Survey (USGS)), a request for the first altitude value that identifies the first altitude for the first geographic location. The request may include location data that identifies the first geographic location (e.g., using geographic coordinates for the first geographic location). In this example, the server may use the location data to determine the first altitude of the first geographic location. The server may then provide, to UE 104, a response that includes the first altitude value that identifies the first altitude (e.g., via the interface).

In some implementations, UE 104 may be configured with the first altitude value that identifies the first altitude of the first geographic location. For example, if UE 104 is required to remain at a particular geographic location until the trigger condition is satisfied, then UE 104 may be configured with the first altitude value that identifies the first altitude of the first geographic location.

In this way, UE 104 determines and/or obtains information needed to determine the first expected barometric pressure of the first geographic location.

As shown in FIG. 1C, and by reference number 118, UE 104 may determine the first expected barometric pressure for the first geographic location. For example, UE 104 may determine the first expected barometric pressure based on the reference altitude, the first reference barometric pressure, the first altitude of the first geographic location of UE 104, a barometric pressure/altitude ratio that represents a difference in measured barometric pressure between two or more geographic locations divided by a difference in altitudes between the two or more geographic locations, and/or the like, as further shown below.

In some implementations, UE 104 may execute an expected barometric pressure function to determine the first expected barometric pressure for the first geographic location. For example, because a change in altitude corresponds to a change in pressure, UE 104 may use the expected barometric pressure function to determine a difference between the first altitude for the first the geographic location and the reference altitude for the particular geographic location of reference structure 106. Next, UE 104 may use the expected barometric pressure function to multiply the difference by a barometric pressure/altitude ratio. The barometric pressure/altitude ratio represents a difference in measured barometric pressure between the first geographic location of UE 104 and the particular geographic location of reference structure 106 (e.g., a difference between the first measured barometric pressure and the first reference barometric pressure), divided by a difference in altitude between the first geographic location of UE 104 and the particular geographic location of reference structure 106 (e.g., a difference between the first altitude and the reference altitude). Lastly, UE 104 may determine the first expected barometric pressure by adding the first reference barometric pressure to an output of multiplying the difference by the barometric pressure/altitude ratio.

As shown by reference number 120, UE 104 may determine a first measured barometric pressure for the first geographic location. For example, UE 104 may be configured with a barometric pressure sensor that allows UE 104 to determine measured barometric pressures at particular geographic locations. In this case, UE 104 may use the barometric pressure sensor to determine a first measured barometric pressure for the first geographic location.

In this way, UE 104 determines the first measured barometric pressure and the first expected barometric pressure for the first geographic location.

Figure 1D:
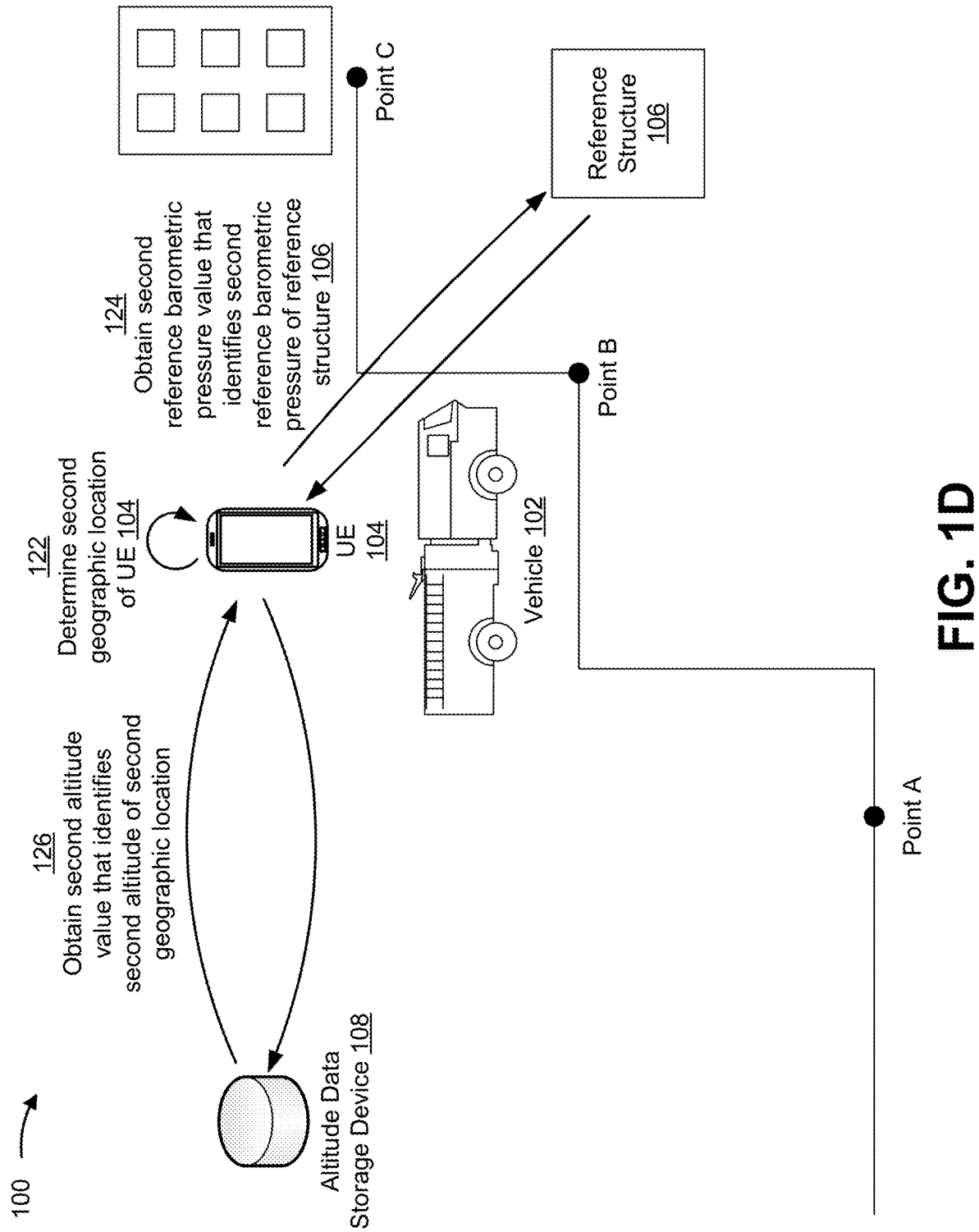

As shown in FIG. 1D, and by reference number 122, UE 104 may determine a second geographic location of UE 104 (shown as Point B). For example, UE 104 may determine the second geographic location of UE 104 in a manner described with regard to FIG. 1B.

As shown by reference number 124, UE 104 may obtain a second reference barometric pressure value that identifies a second reference barometric pressure of reference structure 106. For example, to determine a second expected barometric pressure for the second geographic location, UE 104 may first need to obtain a second reference barometric pressure value that identifies a second reference barometric pressure of reference structure 106. The second reference barometric pressure value may identify a second measured barometric pressure at the particular geographic location of reference structure 106. UE 104 may obtain the second reference barometric pressure value because changes in weather near reference structure 106 may cause changes in barometric pressure. Consequently, UE 104 may need to obtain new reference barometric pressure values for each determined geographic location (e.g., Point A, Point B, and/or the like). The second reference barometric pressure value may be obtained in the same manner described with regard to FIG. 1B.

As shown by reference number 126, UE 104 may obtain a second altitude value that identifies a second altitude of the second geographic location. For example, UE 104 may obtain the second altitude value in the same manner described in connection with FIG. 1B. The second altitude may represent a measured and/or known altitude for the second geographic location.

In this way, UE 104 determines and/or obtains information needed to determine the second expected barometric pressure for the second geographic location.

Figure 1E:
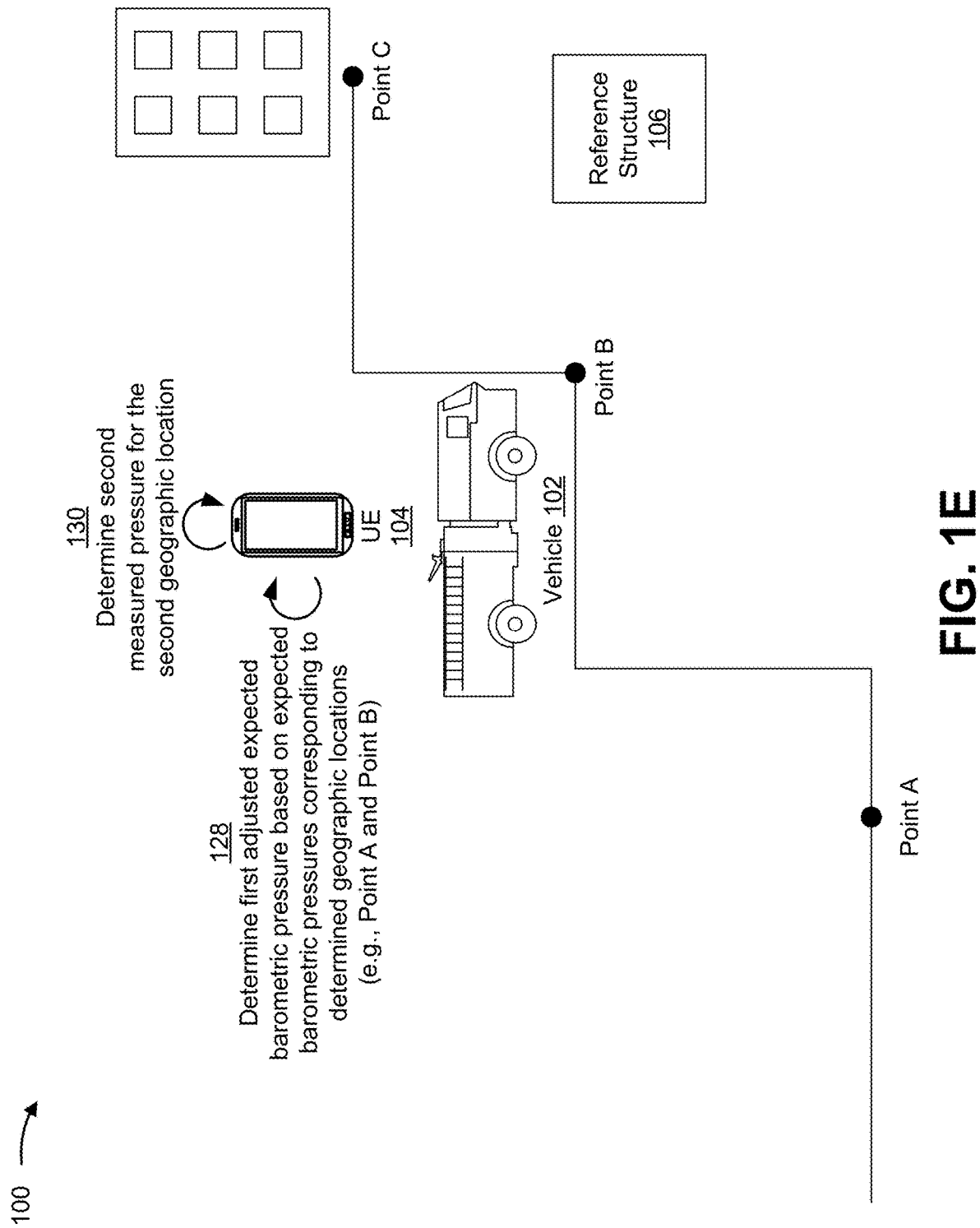

As shown in FIG. 1E, by reference number 128, UE 104 may determine a first adjusted expected barometric pressure based on expected barometric pressures corresponding to determined geographic locations. For example, UE 104 may determine a second expected barometric pressure for the second geographic location and may use the expected barometric pressure function to determine, based on the first expected barometric pressure and the second expected barometric pressure, a first adjusted expected barometric pressure, as will be further described below.

In some implementations, UE 104 may use the expected barometric pressure function to determine the second expected barometric pressure. For example, UE 104 may execute a first set of instructions to determine the second expected barometric pressure. The first set of instructions may cause UE 104 determine a difference between the second altitude of the second geographic location and an average altitude (e.g., between the first geographic location and the second geographic location). Next, the first set of instructions may cause UE 104 to determine a point delta value by multiplying the difference by a barometric pressure/altitude ratio that represents a difference in barometric pressure between the second geographic location of UE 104 and the particular geographic location of reference structure 106 (e.g., a difference between the second measured barometric pressure and the second reference barometric pressure) divided by a difference in altitude between the second geographic location of UE 104 and the particular geographic location of reference structure 106 (e.g., a difference between the second altitude and the reference altitude).

Continuing with the example, UE 104 may execute a second set of instructions of the expected barometric pressure function to determine the first adjusted expected barometric pressure. The second set of instructions may cause UE 104 to determine an average measured barometric pressure (e.g., between the first measured barometric pressure and the second measured barometric pressure) and may cause UE 104 to determine the first adjusted expected barometric pressure by adding the point delta value to the average measured barometric pressure.

In some implementations, UE 104 may determine the first adjusted expected barometric pressure using a Kalman Filter. For example, UE 104 may use a Kalman Filter to analyze a series of data points over time (e.g., data associated with each respective geographic location determined by UE 104) to determine the first adjusted expected barometric pressure.

As shown by reference number 130, UE 104 may determine a second measured barometric pressure for the second geographic location. For example, UE 104 may use the barometric pressure sensor to determine a second measured barometric pressure for the second geographic location.

In this way, UE 104 determines the second measured barometric pressure and the first adjusted expected barometric pressure for the second geographic location.

Figure 1F:
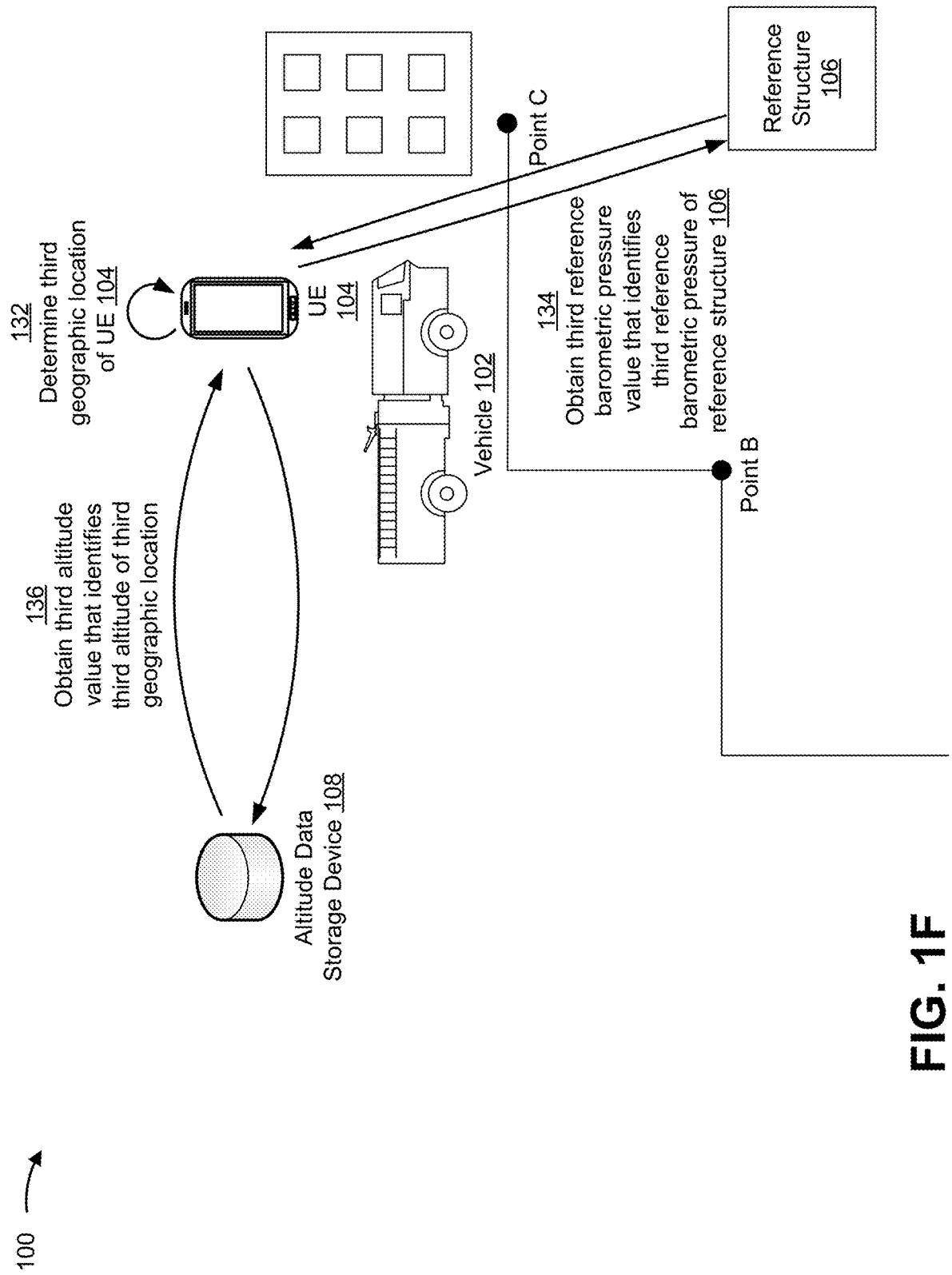

As shown in FIG. 1F, and by reference number 132, UE 104 may determine a third geographic location of UE 104 (shown as Point C). For example, UE 104 may determine the third geographic location of UE 104 in a manner described with regard to FIG. 1B.

As shown by reference number 134, UE 104 may obtain a third reference barometric pressure value that identifies a third reference barometric pressure of reference structure 106. For example, to be able to determine a third expected barometric pressure for the third geographic location, UE 104 may first obtain a third reference barometric pressure value that identifies a third reference barometric pressure for reference structure 106. The third reference barometric pressure may represent a third measured barometric pressure at the particular geographic location of reference structure 106. The third reference barometric pressure value may be obtained in the same manner described with regard to FIG. 1B.

As shown by reference number 136, UE 104 may obtain a third altitude value that identifies a third altitude of the third geographic location. For example, UE 104 may obtain the third altitude value in the same manner described in connection with FIG. 1B. The third altitude may represent a measured altitude of the third geographic location.

In this way, UE 104 obtains and/or determines the first adjusted expected pressure for the second geographic location.

Figure 1G:
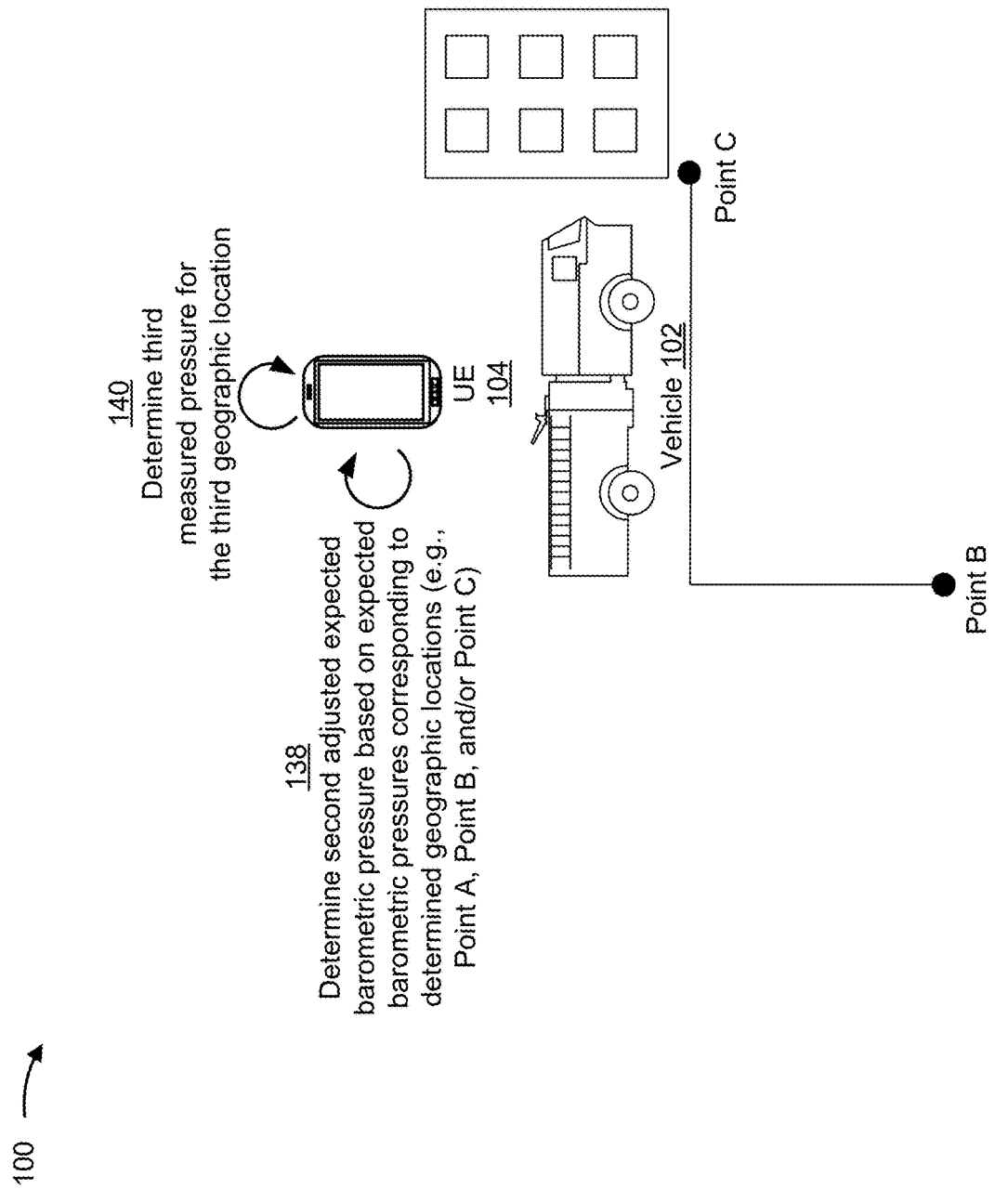

As shown in FIG. 1G, and by reference number 138, UE 104 may determine a second adjusted expected barometric pressure based on the expected barometric pressures corresponding to the determined geographic locations. For example, UE 104 may determine a third expected barometric pressure for the third geographic location and may use the expected barometric pressure function to determine, based on the first expected barometric pressure, the second expected barometric pressure, and the third expected barometric pressure, a second adjusted expected barometric pressure, as will be further described below.

In some implementations, UE 104 may use the expected barometric pressure function to determine the third expected barometric pressure. For example, UE 104 may execute the first set of instructions to determine the third expected barometric pressure. The first set of instructions may cause UE 104 to determine a difference between the third altitude of the third geographic location and an average altitude (e.g., between the first geographic location, the second geographic location, and the third geographic location). Next, the first set of instructions may cause UE 104 to determine a point delta value by multiplying the difference by a barometric pressure/altitude ratio that represents a difference in measured barometric pressure between the third geographic location of UE 104 and the particular geographic location of reference structure 106 (e.g., a difference between the third measured barometric pressure and the third reference barometric pressure) divided by a difference in altitude between the third geographic location of UE 104 and the particular geographic location of reference structure 106 (e.g., a difference between the third altitude and the reference altitude).

Continuing with the example, UE 104 may execute the second set of instructions of the expected barometric pressure function to determine the second adjusted expected barometric pressure. The second set of instructions may cause UE 104 to determine an average measured barometric pressure (e.g., between the first measured barometric pressure, the second measured barometric pressure, and the third measured barometric pressure) and may cause UE 104 to determine the second adjusted expected barometric pressure by adding the point delta value to the average measured barometric pressure.

As shown by reference number 140, UE 104 may determine a third measured barometric pressure for the third geographic location. For example, UE 104 may use the barometric pressure sensor to determine a third measured barometric pressure for the third geographic location.

In this way, UE 104 determines and/or obtains information needed to determine the third expected barometric pressure for the third geographic location.

Figure 1H:
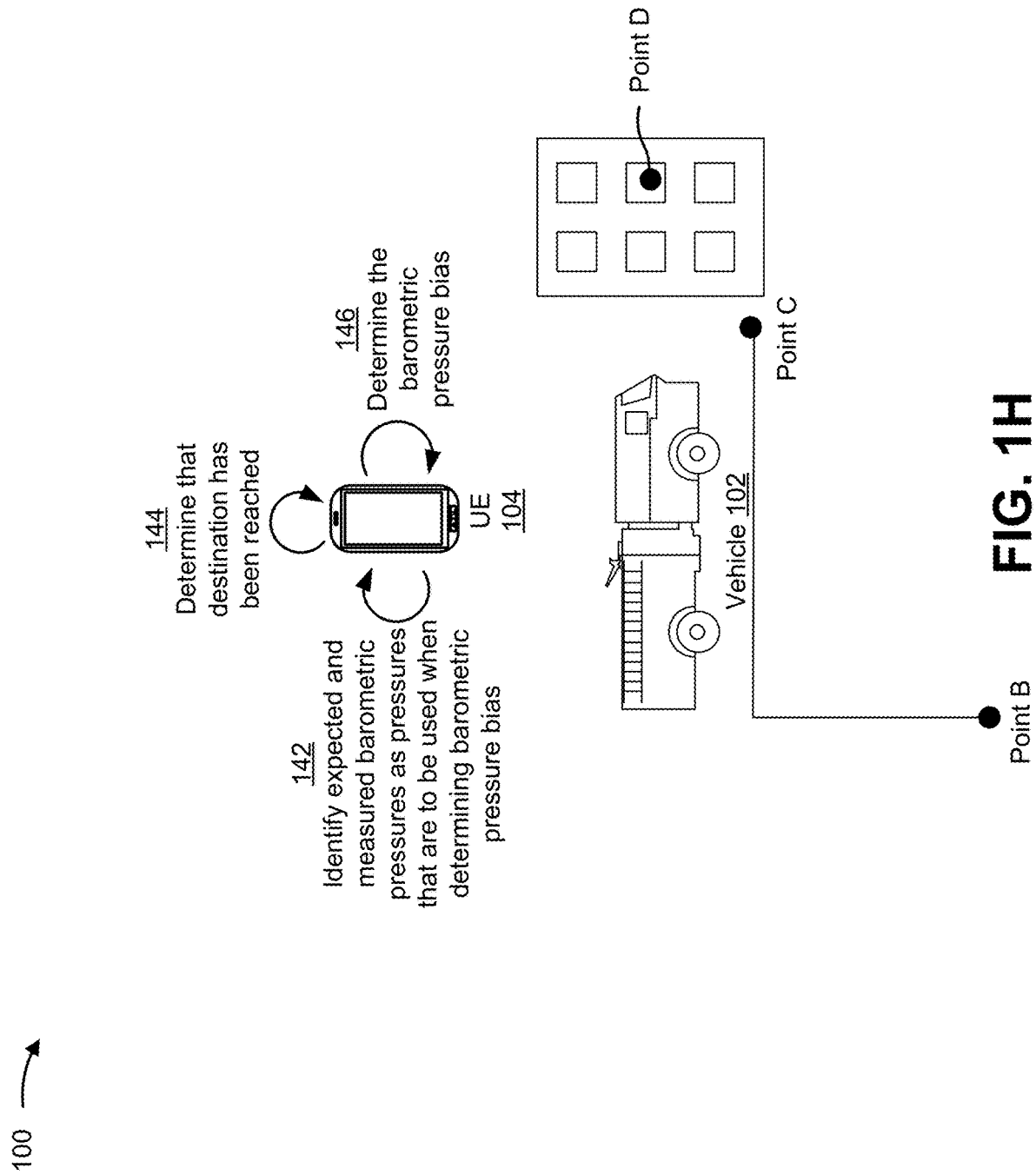

As shown in FIG. 1H, and by reference number 142, UE 104 may identify expected and measured barometric pressures as pressures that are to be used when determining the barometric pressure bias. For example, when determining the barometric pressure bias, UE 104 may only want to use data points that are associated with geographic locations that are at or within a threshold range a ground level of the device. Consequently, UE 104 may determine that UE 104 is moving along the ground level (or within the threshold range of the ground level) by determining, for each geographic location, whether a particular expected barometric pressure and a corresponding measured barometric pressure satisfy a threshold pressure differential (e.g., a group of expected barometric pressures that are similar to a corresponding group of measured barometric pressures may be indicative of UE 104 traveling along the ground level).

If the threshold pressure differential has been satisfied for a given geographic location, UE 104 may identify data corresponding to that geographic location as data that is to be used when determining the barometric pressure bias. If the threshold pressure differential has not been satisfied for a given geographic location, UE 104 may refrain from using data corresponding to that geographic location when determining the barometric pressure bias. Additional information regarding this process may be found in connection with FIG. 5 and/or FIG. 6.

In some implementations, to determine whether UE 104 is traveling at a ground level, UE 104 may compare measured barometric pressures and corresponding expected barometric pressures at each of the determined geographic locations. For example, if the measured barometric pressures satisfy a threshold level of similarity with the corresponding expected barometric pressures, UE 104 may determine that UE 104 is traveling at the ground level. Additionally, or alternatively, UE 104 may perform a regression technique to determine whether UE 104 is traveling at the ground level. For example, UE 104 may perform a least squares error (LSE) technique or a similar technique to analyze a set of data points that represent determined geographic locations (e.g., locations that UE has traveled to) to determine whether UE 104 is traveling at the ground level. Additionally, or alternatively, UE 104 may compare altitudes at each determined geographic location and may determine that UE 104 is traveling at the ground level based on the altitudes satisfying a threshold level of similarity with each other.

As shown by reference number 144, UE 104 may determine that the destination location has been reached. For example, UE 104 may be configured to periodically determine a height of UE 104 after reaching the destination location. In some cases, UE 104 (e.g., using the barometric pressure management application) may interact with a navigation system of vehicle 102 to determine that the destination location has been reached. In other cases, the barometric pressure management application may interact with a navigation application accessible to UE 104 to determine that the destination location has been reached.

Additionally, or alternatively, UE 104 may use the motion sensor (e.g., the accelerometer) to determine that the destination location has been reached. For example, certain speeds of UE 104 may correspond to being within a vehicle whereas other speeds of UE 104 may correspond to an individual who is walking or traveling via another means of transportation. As an example, UE 104 may be configured with a first range of speeds associated with transportation by vehicle 102 and a second range of speeds associated with transportation by an individual who is walking or running. In this example, when the vehicle reaches the destination location, the speed associated with UE 104 will decrease greatly (e.g., from a speed within the first range of speeds to a speed within the second range of speeds), which may cause UE 104 to determine that the destination location has been reached. Additionally, UE 104 may need to spend a threshold amount of time at speeds that are within a particular range of speeds to determine that the destination location has been reached (e.g., such that UE 104 does not falsely determine that the destination location has been reached while vehicle 102 is waiting at a traffic light, a stop sign, and/or the like).

As shown by reference number 146, UE 104 may determine the barometric pressure bias. For example, UE 104 may determine the barometric pressure bias for the destination location based on determining that UE 104 is traveling at the ground level, based on determining that the destination location has been reached, and/or the like. The barometric pressure bias may be based on respective differences between measured barometric pressures and expected barometric pressures. For example, the barometric pressure bias may be based on an average of respective differences between the measured and expected barometric pressures, a mean of the respective differences, a weighted average, a weighted mean, an average and/or a mean that excludes certain data points (e.g., a minimum value, a maximum value, and/or the like), and/or the like. The barometric pressure bias may be used when determining the height of UE 104 inside of the structure associated with the destination location, as described further herein.

In some implementations, UE 104 may determine the barometric pressure bias by determining the average of respective differences between measured barometric pressures and expected barometric pressures. In the example shown, UE 104 may determine the barometric pressure bias by determining a first difference between the first measured barometric pressure and the first expected barometric pressure, by determining a second difference between the second measured barometric pressure and the first adjusted expected barometric pressure (or the second expected barometric pressure), by determining a third difference between the third measured barometric pressure and the second adjusted expected barometric pressure (or the third expected barometric pressure), and by taking an average of the first difference, the second difference, and the third difference.

In some implementations (not shown), UE 104 may be configured to periodically determine the barometric pressure bias. For example, UE 104 may be configured to determine the barometric pressure bias at each determined geographic location. In some cases, this may allow UE 104 to determine measured barometric pressures at each geographic location and to determine adjusted measured barometric pressures at each geographic location (e.g., based on measured barometric pressures and barometric pressure biases). In other cases, UE 104 may use the barometric pressure biases to recalibrate the barometric pressure sensor. This may improve measured barometric pressures determined at other determined geographic locations (e.g., subsequent locations that UE 104 may traverse).

In this way, UE 104 determines the barometric pressure bias at the destination location.

Figure 1I:
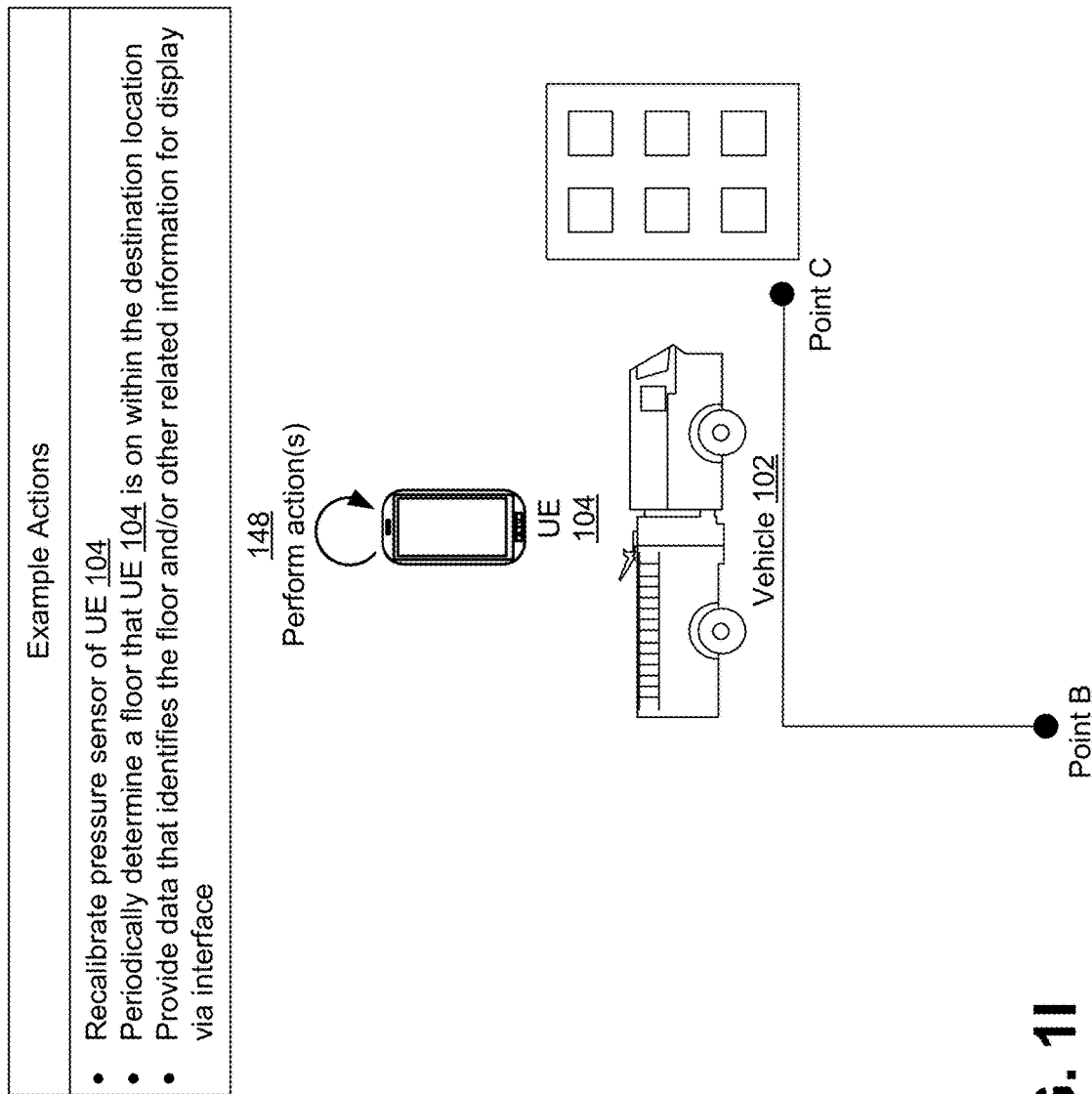

As shown in FIG. 1I, and by reference number 148, UE 104 may perform one or more actions. For example, UE 104 may perform one or more actions based on determining the barometric pressure bias. The one or more actions may include a first action to recalibrate the barometric pressure sensor of UE 104, a second action to periodically determine the floor that UE 104 is on within the structure located at the destination location, a third action to provide data that identifies the floor and/or other related information for display via an interface that is accessible to one or more other devices, and/or the like, as each described below.

In some implementations, UE 104 may recalibrate the barometric pressure sensor of UE 104. For example, a bias of the barometric pressure sensor of UE 104 may cause UE 104 to determine measured barometric pressures that are slightly inaccurate. To address this, UE 104 may recalibrate the barometric pressure sensor based on the barometric pressure bias. For example, UE 104 may, for each determined geographic location, determine a difference between a measured barometric pressure and an adjusted expected barometric pressure (or an expected barometric pressure). In this case, UE 104 may identify a difference between a measured barometric pressure and a corresponding adjusted expected barometric pressure (or a corresponding expected barometric pressure), an average difference between multiple measured barometric pressures and multiple corresponding adjusted expected barometric pressures (or corresponding expected barometric pressures), and/or the like. This may allow UE 104 to cause a setting of the barometric pressure sensor to be modified in a manner that compensates for the difference and/or the average difference.

Additionally, or alternatively, UE 104 may periodically determine the floor that UE 104 is on within the structure located at the destination location. For example, to determine the floor, UE 104 may first determine a new measured barometric pressure for a new geographic location of UE 104 (e.g., which may be part of the destination location). Additionally, UE 104 may determine an adjusted measured barometric pressure based on the new measured barometric pressure and the barometric pressure bias (e.g., the barometric pressure bias may be used to adjust the new measured barometric pressure). In this case, UE 104 may determine a height of UE 104 based on the new geographic location and the adjusted expected barometric pressure.

In some implementations, multiple UEs 104 may determine floors that the multiple UEs 104 are located on within the structure. For example, each of the multiple UEs 104 may determine a respective floor in a manner described above. In some cases, a particular floor and/or a particular altitude corresponding to the particular floor may be determined relative to other floors and/or other altitudes. For example, a first UE 104 may determine that the first UE 104 is on a particular floor. If the first UE 104 broadcasts floor data identifying the particular floor to one or more other nearby UEs 104, the one or more other UEs 104 may determine a floor relative to the particular floor. In this way, the one or more other UEs 104 conserve processing resources relative to having to each individually determine the floor (e.g., without the floor data of the first UE 104).

Additionally, or alternatively, UE 104 may provide floor data that identifies the floor and/or other related information for display via the interface that is accessible to one or more other devices. For example, a member of a first response unit may access a particular UE 104 via the interface to view the floor data that identifies the floor of UE 104 and/or the other related information. This may allow the member to track a specific location of UE 104. The other related information may include data that identifies specific locations of other UEs 104 located in or near the structure (e.g., UEs 104 associated with other first responders, UEs 104 associated with civilians inside of the structure, and/or the like), barometric pressure bias data for UE 104 and/or the other UEs 104, and/or the like. By using the interface to view the specific locations each UE 104, the particular UE 104 may be able to perform actions relating to assistance of first response efforts at the structure.

In some implementations, UE 104 may cause barometric pressure bias values, the floor data that identifies the floor, and/or the other related information (collectively referred to as storage data) to be stored via a data structure. For example, UE 104 may provide the storage data to a server device that is to be used to store the storage data. The storage data may, for example, be used to store a labeled schematic of the building, where the schematic accurately identifies specific dimensions of each floor of the structure.

By determining the barometric pressure bias at the destination location, UE 104 is able to efficiently, effectively, and/or accurately measure barometric pressures at specific locations within the destination location. For example, UE 104 may use the barometric pressure bias to accurately measure a barometric pressure at a specific location within the destination location, such that the barometric pressure bias offsets any bias or skew caused by the barometric pressure sensor. By accurately measuring barometric pressures, UE 104 is able to determine accurate heights of UE 104 at specific locations (e.g., relative to heights determined without the barometric pressure bias), to determine accurate floors that UE 104 is located on within the structure located at the destination location (e.g., relative floors determined using an inaccurate measured barometric pressure), and/or the like.

As indicated above, FIGS. 1A-1I are provided as one or more examples. Other examples can differ from what is described with regard to FIGS. 1A-1I.

Figure 2:
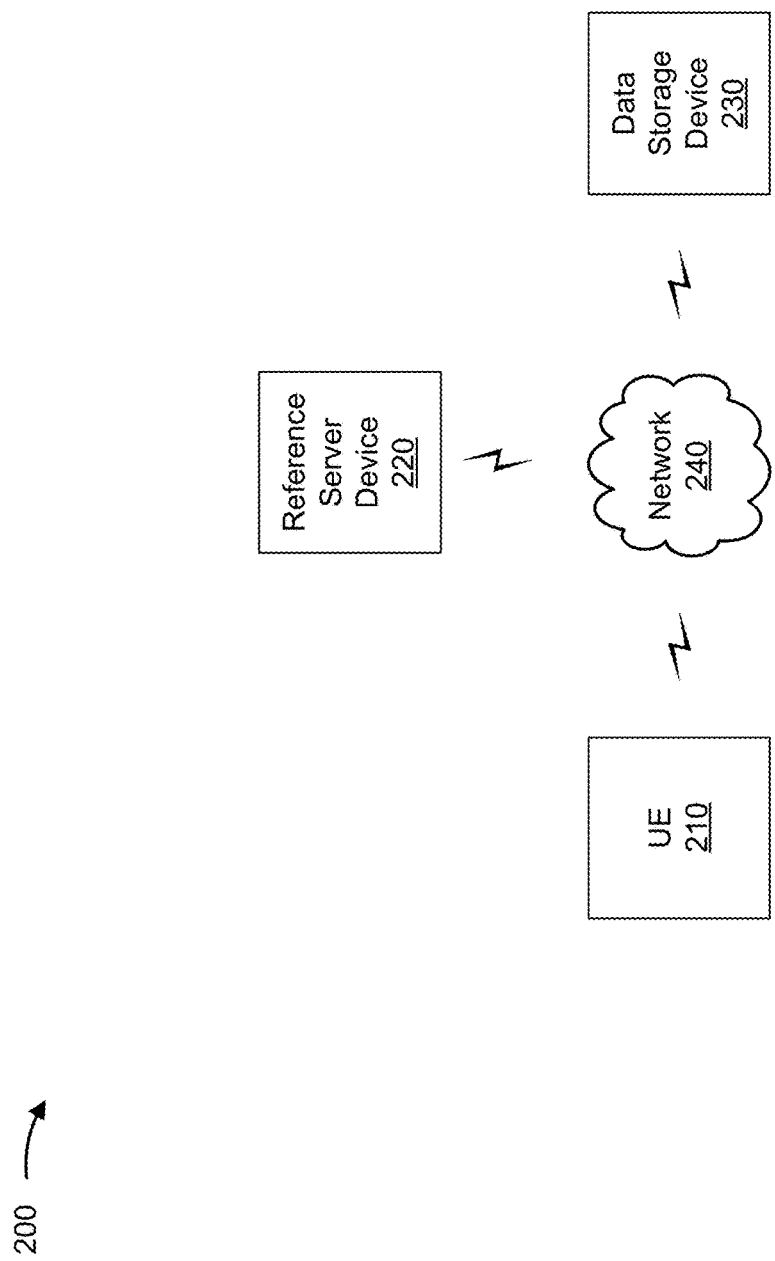
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user equipment (UE) 210, a reference server device 220, a data storage device 230, and/or a network 240. Devices of environment 200 may interconnect via wired connections, wireless connections, or a combination of wired and wireless connections.

UE 210 includes one or more devices capable of receiving, storing, processing, and/or providing information, such as information described herein. For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an Internet of Things (IoT) device (e.g., a smart appliance, a smart light, a connected vehicle, and/or the like), and/or a similar device. In some implementations, UE 210 may include one or more sensors, such as a motion sensor (e.g., an accelerometer), a location tracking sensor, a barometric pressure sensor, and/or another type of sensor. In some implementations, UE 210 may host and/or support a barometric pressure management application.

In some implementations, UE 210 may use an interface (e.g., an application programming interface (API) or another type of communication interface) to obtain, from reference server device 220, a reference altitude value and/or a reference barometric pressure value. In some implementations, UE 210 may use another interface to obtain, from data storage device 230, an altitude value of a particular geographic location. In some implementations, UE 210 may perform one or more actions described elsewhere herein. For example, UE 210 may transmit, to one or more other devices, a message and/or a notification that includes a barometric pressure bias value and/or other information associated with the barometric pressure bias value.

Reference server device 220 includes one or more devices that are capable of receiving, storing, processing, and/or providing reference measurement information. For example, reference server device 220 may include a server device or a group of server devices. In some implementations, reference server device 220 may be associated with a reference structure that serves as a point of reference for UE 210. For example, the reference structure may include a building (e.g., a weather station, and/or the like), a landmark, an object, and/or the like.

Data storage device 230 includes one or more devices capable of receiving, storing, processing, and/or providing information associated with an altitude of a particular geographic location. For example, data storage device 230 may include a server device or a group of server devices.

Network 240 includes one or more wired and/or wireless networks. For example, network 240 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
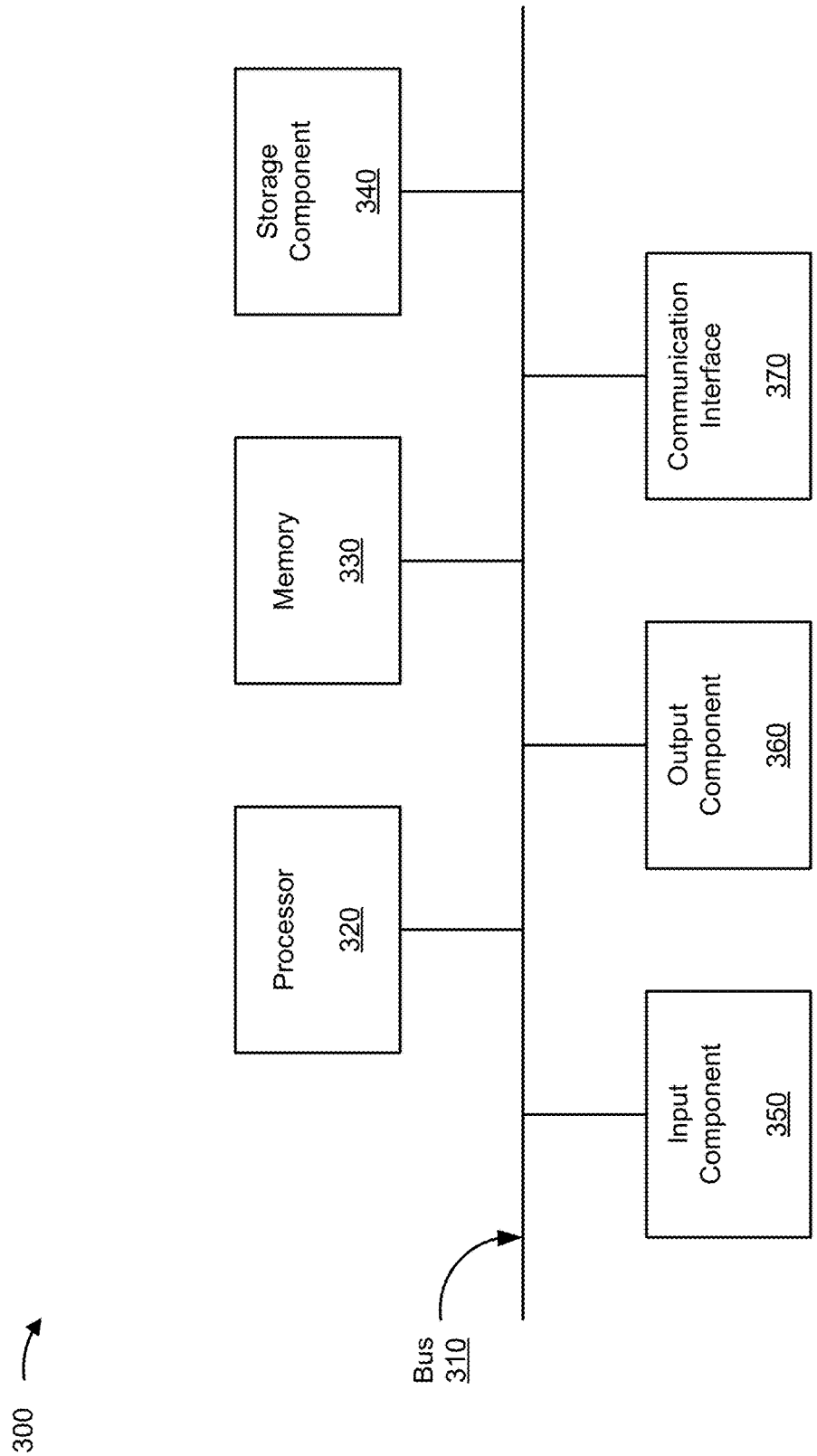
FIG. 3 is a diagram of example components of one or more devices of FIG. 2.

FIG. 3 is a diagram of example components of a device 300. Device 300 may correspond to UE 210, reference server device 220, and/or data storage device 230. In some implementations, UE 210, reference server device 220, and/or data storage device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
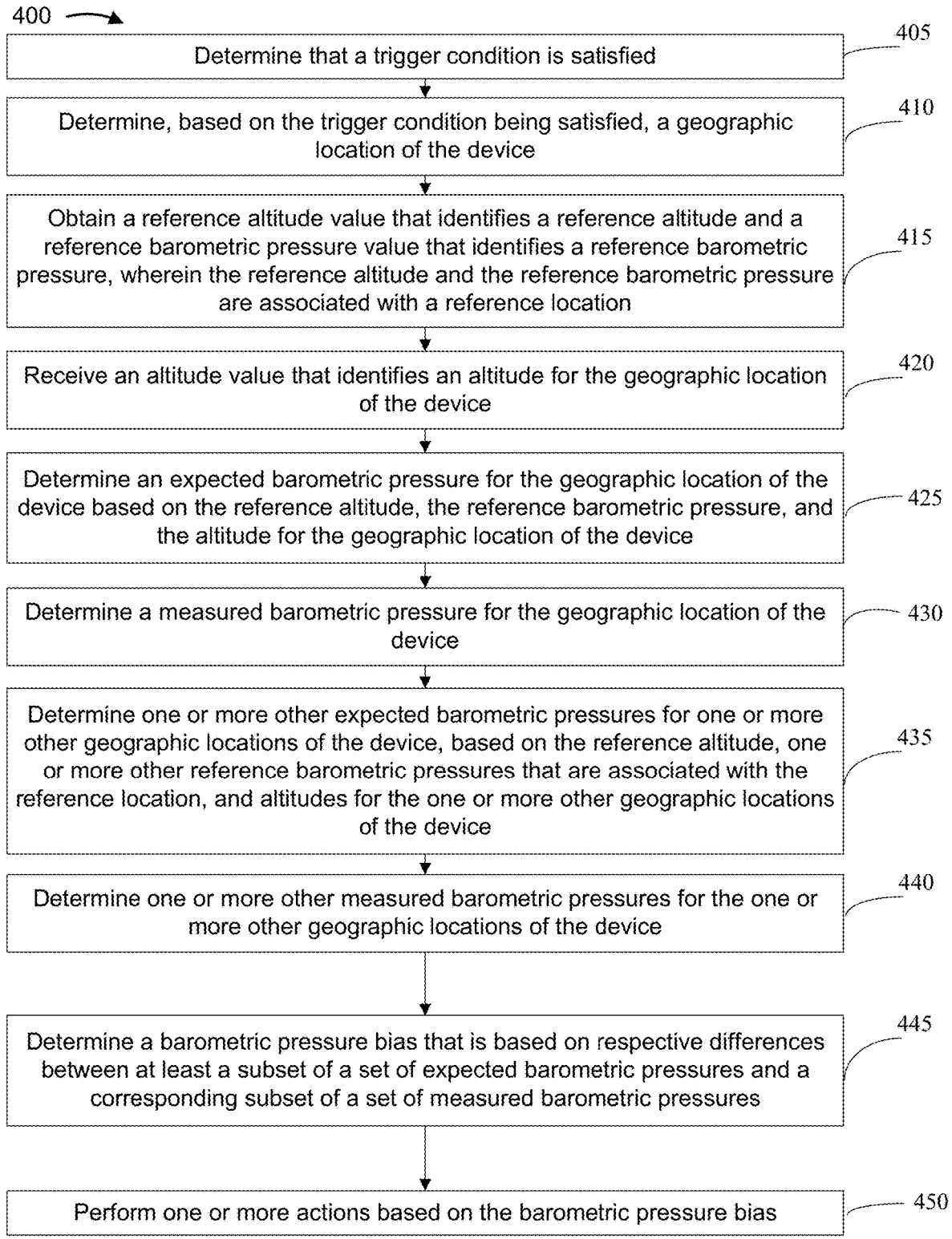
FIG. 4 is a flowchart of an example process for determining a barometric pressure bias of a device and using the barometric pressure bias to perform one or more actions.

FIG. 4 is a flowchart of an example process 400 for systems and methods for determining a barometric pressure bias of a device and using the barometric pressure bias to perform one or more actions. In some implementations, one or more process blocks of FIG. 4 may be performed by a device (e.g., a user equipment (UE), such as UE 210). In some implementations, one or more process blocks of FIG. 4 may be performed by another device or a group of devices separate from or including the device, such as a reference server device associated with a reference structure (e.g., reference server device 220), a data storage device (e.g., data storage device 230), and/or the like.

As shown in FIG. 4, process 400 may include determining that a trigger condition is satisfied (block 405). For example, the device (e.g., using processor 320, memory 330, storage component 340, input component 350, communication interface 370, and/or the like) may determine that a trigger condition is satisfied, as described herein. In some implementations, the trigger condition may include at least one of: a first trigger condition that is satisfied based on a speed of the device satisfying a threshold speed, or a second trigger condition that is satisfied based on a user submitting a request.

In some implementations, the device may be configured with a motion sensor. In this case, the device may receive, from the motion sensor, data that identifies a speed of the device, and may determine that the trigger condition is satisfied based on receiving the data that identifies the speed of the device.

As further shown in FIG. 4, process 400 may include determining, based on the trigger condition being satisfied, a geographic location of the device (block 410). For example, the device (e.g., using processor 320, memory 330, storage component 340, and/or the like) may determine, based on the trigger condition being satisfied, a geographic location of the device, as described herein.

As further shown in FIG. 4, process 400 may include obtaining a reference altitude value that identifies a reference altitude and a reference barometric pressure value that identifies a reference barometric pressure, wherein the reference altitude and the reference barometric pressure are associated with a reference location (block 415). For example, the device (e.g., using processor 320, memory 330, storage component 340, input component 350, output component 360, communication interface 370, and/or the like) may obtain a reference altitude value that identifies a reference altitude and a reference barometric pressure value that identifies a reference barometric pressure, as described herein. In some implementations, the reference altitude and the reference barometric pressure may be associated with a reference location. In some implementations, the reference location may be within a threshold distance of the geographic location of the device.

As further shown in FIG. 4, process 400 may include receiving an altitude value that identifies an altitude for the geographic location of the device (block 420). For example, the device (e.g., using processor 320, memory 330, storage component 340, input component 350, and/or the like) may receive an altitude value that identifies an altitude for the geographic location of the device, as described herein. In some implementations, when receiving the altitude value, the device may provide, to a server device (e.g., the data storage device) and via an application programming interface (API), a request for the altitude for the geographic location. This may cause the device to receive, via the API, the altitude value from the server device.

As further shown in FIG. 4, process 400 may include determining an expected barometric pressure for the geographic location of the device based on the reference altitude, the reference barometric pressure, and the altitude for the geographic location of the device (block 425). For example, the device (e.g., using processor 320, memory 330, storage component 340, and/or the like) may determine an expected barometric pressure for the geographic location of the device based on the reference altitude, the reference barometric pressure, and the altitude for the geographic location of the device, as described herein.

In some implementations, when determining the expected barometric pressure for the geographic location of the device, the device may determine a difference between the altitude value for the geographic location and the reference altitude value. Additionally, the device may multiply the difference by a ratio between a pressure difference and an altitude difference. Furthermore, the device may add the reference barometric pressure and an output of multiplying the difference by the ratio between the pressure difference and the altitude difference.

As further shown in FIG. 4, process 400 may include determining a measured barometric pressure for the geographic location of the device (block 430). For example, the device (e.g., using processor 320, memory 330, storage component 340, input component 350, and/or the like) may determine a measured barometric pressure for the geographic location of the device, as described herein. In some implementations, the device may include a pressure sensor for determining measured barometric pressures. In this case, the pressure sensor may determine the measured barometric pressure and may provide a measured barometric pressure value that identifies the measured barometric pressure to one or more processors (e.g., processor 320) of the device.

As further shown in FIG. 4, process 400 may include determining one or more other expected barometric pressures for one or more other geographic locations of the device, based on the reference altitude, one or more other reference barometric pressures that are associated with the reference location, and altitudes for the one or more other geographic locations of the device (block 435). For example, the device (e.g., using processor 320, memory 330, storage component 340, and/or the like) may determine one or more other expected barometric pressures for one or more other geographic locations of the device, based on the reference altitude, one or more other reference barometric pressures that are associated with the reference location, and altitudes for the one or more other geographic locations of the device, as described herein.

In some implementations, when determining an adjusted expected barometric pressure that is one of the one or more other expected barometric pressures, the device may determine a difference between a particular altitude for a particular geographic location, of the one or more other geographic locations, and the reference altitude. Additionally, the device may multiply the difference by a ratio between a pressure difference and an altitude difference. Furthermore, the device may add a particular reference barometric pressure, of the one or more other reference barometric pressures, and a first output of multiplying the difference by the ratio between the pressure difference and the altitude difference. Moreover, the device may determine an average expected barometric pressure between the particular geographic location and one or more other particular geographic locations that correspond to one or more previously determined expected barometric pressures. In this case, the device may determine the adjusted expected barometric pressure by adding the average expected barometric pressure and a second output that represents a sum of the particular reference barometric pressure and the first output.

In some implementations, the device may determine, before determining the barometric pressure bias, that the subset of the set of expected barometric pressures and the corresponding subset of the set of measured barometric pressures satisfy a threshold pressure differential. Additionally, the device may identify the subset and the corresponding subset as pressures that are to be used for determining the barometric pressure bias based on the subset and the corresponding subset satisfying the threshold pressure differential.

As further shown in FIG. 4, process 400 may include determining one or more other measured barometric pressures for the one or more other geographic locations of the device (block 440). For example, the device (e.g., using processor 320, memory 330, storage component 340, input component 350, and/or the like) may determine one or more other measured barometric pressures for the one or more other geographic locations of the device, as described herein.

In some implementations, the device may include the pressure sensor for determining measured barometric pressures. In this case, the pressure sensor may determine the one or more other measured barometric pressures and may provide one or more measured barometric pressure values that identify the one or more measured barometric pressures to one or more processors (e.g., processor 320) of the device.

As further shown in FIG. 4, process 400 may include determining a barometric pressure bias that is based on respective differences between at least a subset of a set of expected barometric pressures and a corresponding subset of a set of measured barometric pressures (block 445). For example, the device (e.g., using processor 320, memory 330, storage component 340, and/or the like) may determine a barometric pressure bias that is based on respective differences between at least a subset of a set of expected barometric pressures and a corresponding subset of a set of measured barometric pressures, as described herein.

The set of expected barometric pressures may include the expected barometric pressure and the one or more other expected barometric pressures. The set of measured barometric pressures may include the measured barometric pressure and the one or more other measured barometric pressures. In some implementations, the device may determine the barometric pressure bias based on the subset of the set of expected barometric pressures and the corresponding subset of the set of measured barometric pressures.

As further shown in FIG. 4, process 400 may include performing one or more actions based on the barometric pressure bias (block 450). For example, the device (e.g., using processor 320, memory 330, storage component 340, input component 350, output component 360, communication interface 370, and/or the like) may perform one or more actions based on the barometric pressure bias, as described herein.

In some implementations, the device may determine a new measured barometric pressure for a new geographic location. In this case, the device may determine an adjusted measured barometric pressure based on the new measured barometric pressure and the barometric pressure bias. Additionally, the device may determine, based on the new geographic location of the device and the adjusted measured barometric pressure, a height of the device. Furthermore, the device may determine, based on the new geographic location and the height of the device, a floor that the device is located on in a structure associated with the new geographic location, and may perform one or more additional actions after determining the floor that the device is located on in the structure.

In some implementations, the device may recalibrate a pressure sensor of the device based on the barometric pressure bias.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
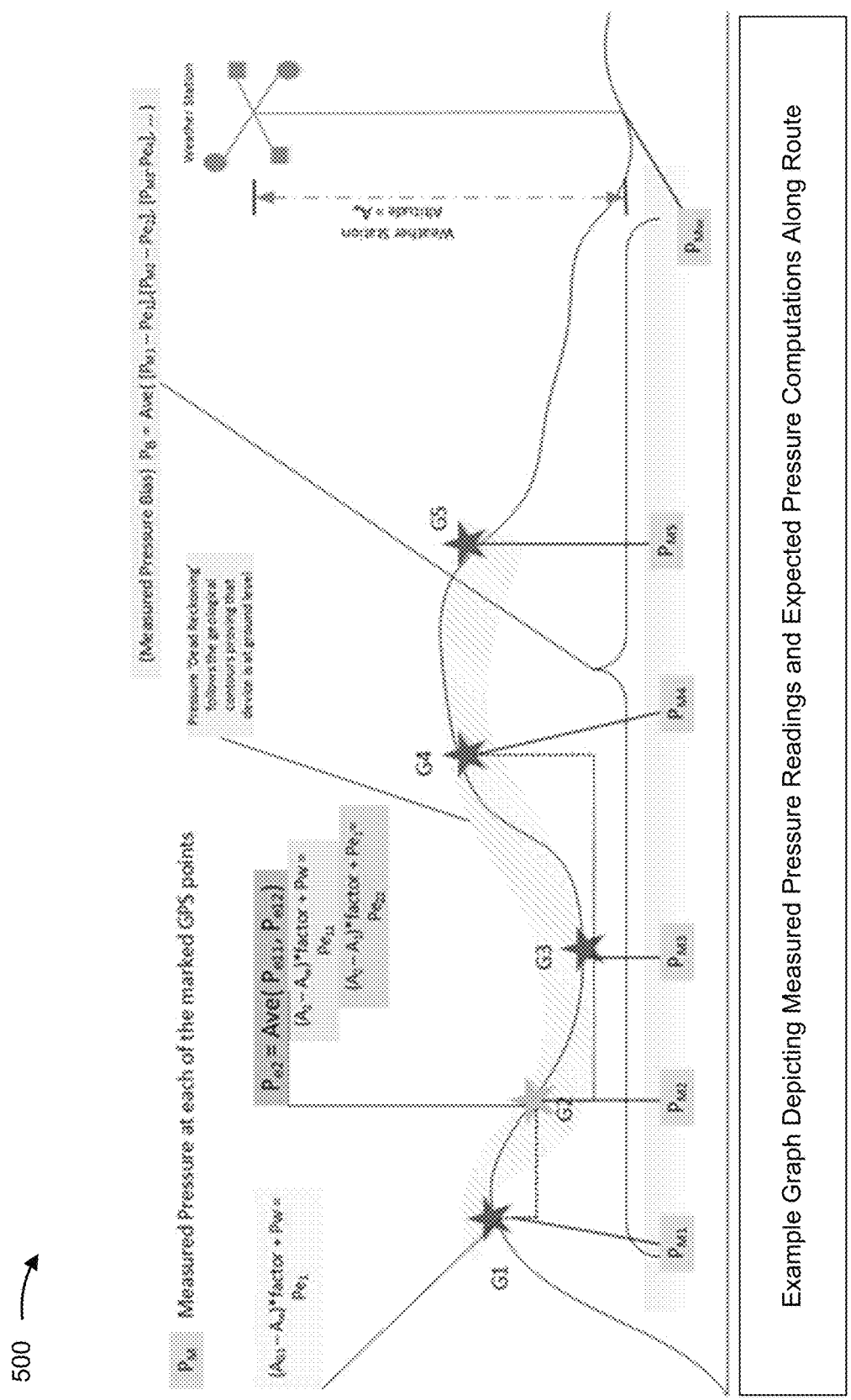
FIG. 5 is a diagram of an example graph depicting measured barometric pressures and expected barometric pressures along a path of a mobile device.

FIG. 5 is a diagram of an example graph depicting measured barometric pressures and expected barometric pressures along a path of a mobile device. For example, the mobile device (e.g., user equipment (UE) 104, UE 210, and/or the like) may, while moving toward a destination location, periodically determine a set of geographic locations of the mobile device (shown as geographic locations G1, G2, G3, G4, and G5).

In some implementations, the mobile device may obtain data that may be used to determine an expected barometric pressure (shown by way of example as $P_{e1}$ and $P_{e2}$, where $P_{e3}$, $P_{e4}$, and $P_{e5}$ are unlabeled) at each respective geographic location. For example, to determine the expected barometric pressure at a geographic location, the mobile device may first have to obtain a reference altitude value that identifies a reference altitude (shown as altitude Aw) of a reference location (shown as a weather station), a reference barometric pressure value that identifies a reference barometric pressure (shown as measured barometric pressure Pmw) for the reference location, and an altitude value that identifies an altitude that corresponds to the geographic location of the mobile device (e.g., a first altitude for location G1 is shown as $A_{G1}$ and a second altitude for location G2 is shown as $A_2$). A description of how the mobile device may obtain this data may be found in connection with FIGS. 1A-1I.

In some implementations, the mobile device may use the obtained data to determine the expected barometric pressure at each respective geographic location. For example, the mobile device may determine a first expected barometric pressure ($P_{e1}$) for the first geographic location (G1) using the following equation:

$$P_{e1} = (A_{G1} - A_w) * \text{factor} + P_w \quad (1)$$

In the equation above, the mobile device may determine a difference between a first altitude ($A_{G1}$) at the first geographic location (G1) and a reference altitude ($A_w$) for the weather station (e.g., by subtracting the reference altitude from the first altitude), may multiply the difference against a factor, and may add a reference barometric pressure for the weather station to an output of that multiplication. The factor may be a ratio between a pressure difference and an altitude difference (e.g., ~27.7 feet per hectopascals (hPa)). In some cases, the factor may be based on a graphical representation of a linear area of interest for a collection of historical data points at particular geographic locations (e.g., where the graphical representation includes barometric pressure values as y-coordinates and altitude values (e.g., above sea level) as x-coordinates.

As another example, the mobile device may determine a second expected barometric pressure ($P_{e2}$) for the second geographic location (G2) using the following equations:

$$P_{e2} = (P_{e11} - P_{e12}) \quad (2)$$

$$P_{e11} = (A_2 - A_w) * \text{factor} + P_w \quad (3)$$

$$P_{e12} = (A_2 - A_1) * \text{factor} + P_{e1} \quad (4)$$

In the equations above, the mobile device may determine the second expected barometric pressure ($P_{e2}$) by taking an average of expected barometric pressure $P_{e11}$ and expected barometric pressure $P_{e12}$. To determine expected barometric pressure $P_{e11}$, the mobile device may determine a difference between a second altitude for the second geographic location and the reference altitude, may multiply the difference against the factor, and may add the reference barometric pressure of the weather station to an output of that multiplication. To determine expected barometric pressure $P_{e12}$, the mobile device may determine a difference between a second altitude for the second geographic location and the first altitude for the first geographic location, may multiply the difference against the factor, and may add the first expected barometric pressure for the first geographic location to an output of that multiplication. The mobile device may determine expected barometric pressures for the third, fourth, and fifth geographic locations in a similar manner.

In some implementations, the mobile device may determine a measured barometric pressure at each respective geographic location (shown collectively as $P_m$, and individually as $P_{m1}$, $P_{m2}$, $P_{m3}$, $P_{m4}$, and $P_{m5}$). For example, the mobile device may determine a first measured barometric pressure at the first geographic location using a barometric pressure sensor of the mobile device.

In some implementations, the mobile device may determine a measured barometric pressure bias at each respective geographic location. For example, the mobile device may determine a measured barometric pressure bias using the following equation:

$$P_B = \text{Ave}([P_{m1} - P_{e1}], [P_{m2} - P_{e2}], \ldots, [P_{mn} - P_{en}]) \quad (5)$$

In the equation above, the mobile device may determine the measured barometric pressure by determining an average of differences between expected barometric pressures and measured barometric pressures at each respective geographic location. As a specific example, the mobile device may, while at the third geographic location, determine a measured barometric pressure bias by determining a first difference between the first expected and measured barometric pressures, by determining a second difference between the second expected and measured barometric pressures, by determining a third difference between the third expected and measured barometric pressures, and may determining an average between the first, second, and third differences.

In some implementations, data used to determine the barometric pressure bias may associated with geographic locations that are known to be at a ground level or within a threshold distance of the ground level. In this case, the mobile device may determine that the device is moving along a ground level based on measured barometric pressures being within a threshold range of corresponding expected barometric pressures. For example, the mobile device may use a regression technique or another type of technique to map measured barometric pressures and expected barometric pressures over a group of geographic locations. In this case, the mobile device may, for each geographic location, determine whether a difference between a measured barometric pressure and an expected barometric pressure satisfies a threshold pressure differential. If the threshold pressure differential has been satisfied for a given geographic location, the mobile device may use data corresponding to that geographic location when determining the barometric pressure bias. If the threshold pressure differential has not been satisfied for a given geographic location, the mobile device may refrain from using data corresponding to that geographic location when determining the barometric pressure bias.

In some implementations, the mobile device may use a least square error (LSE) technique to determine whether a difference between measured barometric pressures and corresponding expected barometric pressures satisfy the threshold pressure differential. For example, the mobile device may use the LSE technique to establish correlations between measured barometric pressures and corresponding estimated barometric pressures for a group of geographic locations. In this case, the mobile device may, for measured and estimated barometric pressures of each geographic location, compute a correlation value and may compare the correlation value with the threshold pressure differential to determine to determine whether the measured and estimated barometric pressures for each geographic location may be used when determining the barometric pressure bias. To provide a specific example, the mobile device may compute the correlation value using the following equation:

$$\text{Correlation Value} = \Sigma([P_{M1}-P_{e1}]+[P_{M1}-P_{e1}]+ \ldots +[P_{M1}-P_{e1}])/n \quad (6)$$

In the equation above, the mobile device (e.g., using the LSE technique) may compute correlation value by determining a sum of a difference between expected and measured barometric pressures at each determined geographic location (e.g., a difference between the first measured barometric pressure and the first expected barometric pressure is shown by $[P_{M1}-P_{e1}]$). Next, the mobile device may determine an average between each respective difference to determine the correlation value. Additionally, the mobile device may compare the correlation value with the threshold pressure differential (e.g., which may specify a maximum allowance error for pressure differences that represent the ground level). If the correlation value satisfies the threshold pressure differential (e.g., is less than the threshold pressure differential), then the mobile device may determine the barometric pressure bias at a current geographic location. If the correlation value does not satisfy the threshold pressure differential, then the mobile device may refrain from determining the barometric pressure bias at the current geographic location. In this way, the mobile device ensures that data is only used for determining the barometric pressure bias if that data has been determined or obtained while the mobile device is moving along the ground level (or within a threshold distance of the ground level).

As indicated above, FIG. 5 is provided as an example. Other examples can differ from what is described with regard to FIG. 5.

Figure 6:
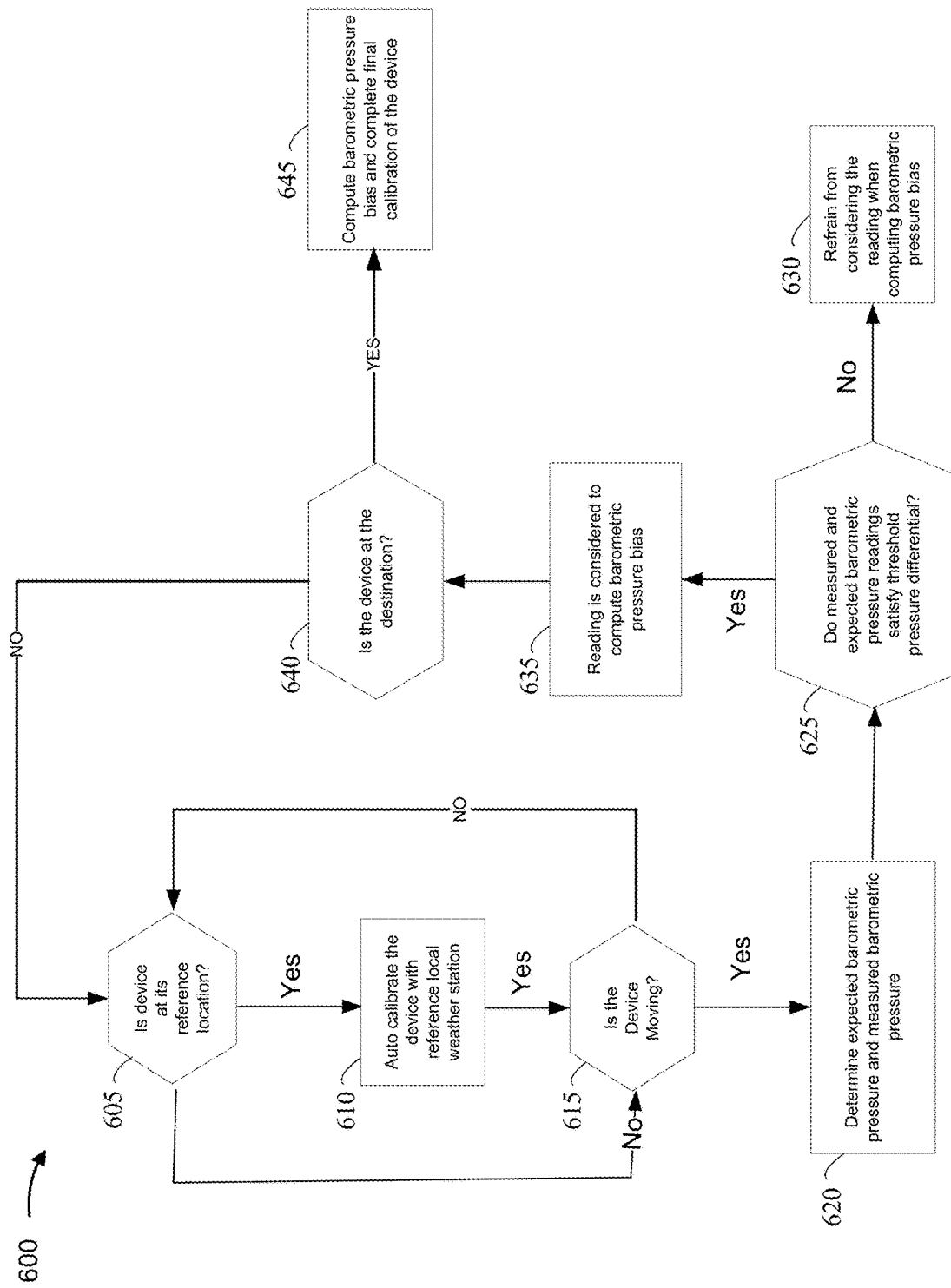
FIG. 6 is a flowchart of an example process for determining a barometric pressure bias of a device based on determining that expected and measured barometric pressures at a set of geographic locations satisfy a threshold pressure differential.

FIG. 6 is a flowchart of an example process 600 for systems and methods for determining a barometric pressure bias of a device based on determining that expected and measured barometric pressures at a set of geographic locations satisfy a threshold pressure differential. In some implementations, one or more process blocks of FIG. 6 may be performed by a device (e.g., a user equipment (UE), such as UE 210). In some implementations, one or more process blocks of FIG. 6 may be performed by another device or a group of devices separate from or including the device, such as a reference server device associated with a reference structure (e.g., reference server device 220), a data storage device (e.g., data storage device 230), and/or the like.

As shown in FIG. 6, process 600 may include determining whether the device is located at a reference location (block 605). For example, the device may determine whether the device is located at a reference location by comparing a current geographic location of the device with the reference location.

If the device determines that the device is located at the reference location, process 600 may include automatically calibrating with a reference local weather station (block 610). For example, the device may automatically calibrate with a reference local weather station by using a communication interface (e.g., an API or another type of interface) to obtain a reference altitude value that identifies a reference altitude and a reference barometric pressure value that identifies a reference barometric pressure.

If the device determines that the device is not located at the reference location, or if the device has finished automatically calibrating with the reference local weather station, then process 600 may include determining whether the device is in motion (block 615). For example, the device may determine whether the device is in motion by using a motion sensor (e.g., an accelerometer) to determine a speed of the device. In some implementations, the device may determine whether a speed of the device satisfies a threshold speed (e.g., to eliminate scenarios where the device is in motion within the reference location, where it does not need to be performing barometric pressure measurements and determinations).

As further shown in FIG. 6, process 600 may include determining an expected barometric pressure and a measured barometric pressure for a geographic location of the device (block 620). For example, the device may determine an expected barometric pressure and a measured barometric pressure for a geographic location in a manner described in connection with FIGS. 1A-1E and/or FIG. 5. In some implementations, the device may determine a set of expected barometric pressures and a corresponding set of measured barometric pressures at a group of geographic locations (e.g., while the device is in motion).

As further shown in FIG. 6, process 600 may include determining whether the set of expected barometric pressures and the set of measured barometric pressures satisfy a threshold pressure differential (block 625). For example, the threshold pressure differential may represent a maximum allowable rate of error between measured and expected pressures for a given geographic location. Additionally, the threshold pressure differential may be set to determine a ground contour that maps to a ground level of the device, and may be used to determine whether a particular geographic location of the device (and corresponding altitude) is part of that ground level. Consequently, if an expected barometric pressure and a measured barometric pressure for the particular geographic location satisfy the threshold pressure differential, the device may be able to conclude that the particular geographic location (and corresponding altitude) of the device is part of the ground level. A description of how the mobile device determines whether expected and measured barometric pressures satisfy the threshold pressure differentiation may be found in connection with FIG. 1H and/or FIG. 5.

If the device determines that one or more expected barometric pressures, of the set of expected barometric pressures, and one or more measured barometric pressures, of the set of measured barometric pressures, do not satisfy the threshold pressure differential, then process 600 may include refraining from using the one or more expected barometric pressures and the one or more measured barometric pressures when computing a barometric pressure bias of the device (block 630). For example, the device may determine that a first expected barometric pressure and a first measured barometric pressure for a particular geographic location do not satisfy the threshold pressure differential. Consequently, the device may refrain from using the first expected barometric pressure and the first measured barometric pressure when computing the barometric pressure bias of the device.

If the device determines that one or more expected barometric pressures, of the set of expected barometric pressures, and one or more measured barometric pressures, of the set of measured barometric pressures, do satisfy the threshold pressure differential, then process 600 may include identifying the one or more expected barometric pressures and the one or more measured barometric pressures as pressures that are to be considered when computing the barometric pressure bias of the device (block 635). For example, the device may identify the one or more expected barometric pressures and the one or more measured barometric pressures as pressures that are to be considered when computing the barometric pressure bias of the device (e.g., by flagging pressure values for those pressures, by storing pressure values for those pressures via a data structure, by selecting the pressure values for those pressures from a data structure, and/or the like).

As further shown in FIG. 6, process 600 may include determining whether the device is at the destination (block 640). For example, the device may determine whether the device is at the destination in a manner described in connection with FIG. 1H.

If the device determines that the device is at the destination, then process 600 may include computing the barometric pressure bias and completing a final calibration of the device (block 645). For example, the device may compute the barometric pressure bias by using the identified expected and measured barometric pressures (e.g., which satisfied the threshold pressure differential). If the device determines that the device is not at the destination, then the device may continue determining whether the device is at the reference location (block 605).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device, that a trigger condition is satisfied;
   determining, by the device and based on the trigger condition being satisfied, a geographic location of the device;
   obtaining, by the device, a reference altitude value that identifies a reference altitude and a reference barometric pressure value that identifies a reference barometric pressure,
      wherein the reference altitude and the reference barometric pressure are associated with a reference location that is within a threshold distance of the geographic location of the device;
   receiving, by the device, an altitude value that identifies an altitude for the geographic location of the device;
   determining, by the device, a measured barometric pressure for the geographic location of the device;
   determining, by the device, an expected barometric pressure for the geographic location of the device based on the reference altitude, the reference barometric pressure, and the altitude for the geographic location of the device;
   determining, by the device, one or more other measured barometric pressures for one or more other geographic locations of the device;
   determining, by the device, one or more other expected barometric pressures for the one or more other geographic locations of the device, based on the reference altitude, one or more other reference barometric pressures that are associated with the reference location, and altitudes for the one or more other geographic locations of the device,
      wherein the expected barometric pressure and the one or more other expected barometric pressures are a set of expected barometric pressures, and
      wherein the measured barometric pressure and the one or more other measured barometric pressures are a set of measured barometric pressures;
   determining, by the device, a barometric pressure bias that is based on respective differences between at least a subset of the set of expected barometric pressures and a corresponding subset of the set of measured barometric pressures; and
   performing, by the device, one or more actions based on the barometric pressure bias.

2. The method of claim 1, further comprising:
   determining, before determining the barometric pressure bias, that the subset of the set of expected barometric pressures and the corresponding subset of the set of measured barometric pressures satisfy a threshold pressure differential;
   identifying the subset and the corresponding subset as pressures that are to be used for determining the barometric pressure bias based on the subset and the corresponding subset satisfying the threshold pressure differential; and
   wherein determining the barometric pressure bias comprises:
      determining the barometric pressure bias based on the subset of the set of expected barometric pressures and the corresponding subset of the set of measured barometric pressures.

3. The method of claim 1, wherein the trigger condition includes at least one of:
   a first trigger condition that is satisfied based on a speed of the device satisfying a threshold speed, or
   a second trigger condition that is satisfied based on a user submitting a request.

4. The method of claim 1, wherein receiving the altitude value comprises:
   providing, to a server device and via an application programming interface (API), a request for the altitude for the geographic location,
      wherein the request includes data that identifies the geographic location of the device, and
   receiving, via the API, the altitude value from the server device.

5. The method of claim 1, wherein determining the expected barometric pressure is based on:
   determining a difference between the altitude value for the geographic location and the reference altitude value,
   multiplying the difference by a ratio between a pressure difference and an altitude difference, and
   adding the reference barometric pressure and an output of multiplying the difference by the ratio between the pressure difference and the altitude difference.

6. The method of claim 1, wherein performing the one or more actions comprises:
   determining a new measured barometric pressure for a new geographic location,
   determining an adjusted measured barometric pressure based on the new measured barometric pressure and the barometric pressure bias,
   determining, based on the new geographic location of the device and the adjusted measured barometric pressure, a height of the device,
   determining, based on the new geographic location and the height of the device, a floor that the device is located on in a structure associated with the new geographic location, and
   performing one or more additional actions after determining the floor that the device is located on in the structure.

7. The method of claim 1, wherein performing the one or more actions comprises:
   recalibrating a pressure sensor of the device based on the barometric pressure bias.

8. A device, comprising:
   one or more memories; and
   one or more processors, communicatively coupled to the one or more memories, to:
      determine that a trigger condition is satisfied;
      determine, based on the trigger condition being satisfied, a geographic location of the device;
      receive an altitude value that identifies an altitude for the geographic location of the device;
      receive a measured barometric pressure value that identifies a measured barometric pressure for the geographic location;
      determine an expected barometric pressure for the geographic location of the device based on a reference altitude, a reference barometric pressure, and the altitude for the geographic location of the device,
         wherein the reference altitude and the reference barometric pressure are associated with a reference location;
      receive one or more other measured barometric pressure values that identify one or more other measured barometric pressures for one or more other geographic locations of the device;

determine one or more other expected barometric pressures for the one or more other geographic locations of the device, based on the reference altitude, one or more other reference barometric pressures that are associated with the reference location, and altitudes for the one or more other geographic locations of the device
wherein the expected barometric pressure and the one or more other expected barometric pressures are a set of expected barometric pressures, and
wherein the measured barometric pressure and the one or more other measured barometric pressures are a set of measured barometric pressures;
determine that the device has reached a destination location;
determine, based on determining that the device has reached the destination location, a barometric pressure bias that is based on respective differences between at least a subset of the set of expected barometric pressures and a corresponding subset of the set of measured barometric pressures; and
perform one or more actions based on the barometric pressure bias.

9. The device of claim 8, wherein the one or more processors are further to:
determine, before determining the barometric pressure bias, that the subset of the set of expected barometric pressures and the corresponding subset of the set of measured barometric pressures satisfy a threshold pressure differential;
identify the subset and the corresponding subset as pressures that are to be used for determining the barometric pressure bias based on the subset and the corresponding subset satisfying the threshold pressure differential; and
wherein the one or more processors, when determining the barometric pressure bias, are to:
determine the barometric pressure bias based on the subset of the set of expected barometric pressures and the corresponding subset of the set of measured barometric pressures.

10. The device of claim 8, further comprising a motion sensor; and
wherein the one or more processors, when determining that the trigger condition is satisfied, are to:
receive, from the motion sensor, data that identifies a speed of the device, and
determine that the trigger condition is satisfied based on the data that identifies the speed of the device.

11. The device of claim 8, wherein the device includes a pressure sensor for determining measured barometric pressures;
wherein the one or more processors, when receiving the measured barometric pressure value, are to:
receive the measured barometric pressure value from the pressure sensor; and
wherein the one or more processors, when receiving the one or more other measured barometric pressure values, are to:
receive the one or more other measured barometric pressure values from the pressure sensor.

12. The device of claim 8, wherein the one or more processors, when determining an adjusted expected barometric pressure that is of the one or more other expected barometric pressures, are to:
determine a difference between a particular altitude for a particular geographic location, of the one or more other geographic locations, and the reference altitude,
multiply the difference by a ratio between a pressure difference and an altitude difference,
add a particular reference barometric pressure, of the one or more other reference barometric pressures, and a first output of multiplying the difference by the ratio between the pressure difference and the altitude difference,
determine an average expected barometric pressure between the particular geographic location and one or more other particular geographic locations that correspond to one or more previously determined expected barometric pressures, and
determine the adjusted expected barometric pressure by adding the average expected barometric pressure and a second output that represents a sum of the particular reference barometric pressure and the first output.

13. The device of claim 8, wherein the one or more processors, when performing the one or more actions, are to:
determine a new measured barometric pressure for a new geographic location,
determine an adjusted measured barometric pressure based on the new measured barometric pressure and the barometric pressure bias,
determine, based on the new geographic location of the device and the adjusted measured barometric pressure, a height of the device,
determine, based on the new geographic location and the height, a floor that the device is located on in a structure associated with the new geographic location, and
perform one or more additional actions after determining the floor that the device is located on in the structure.

14. The device of claim 8, further comprising a pressure sensor;
wherein the one or more processors, when performing the one or more actions, are to:
recalibrate the pressure sensor of the device based on the barometric pressure bias.

15. A non-transitory computer-readable medium storing instructions, the instructions comprising:
one or more instructions that, when executed by one or more processors of a device, cause the one or more processors to:
determine that a trigger condition is satisfied;
determine, based on determining that the trigger condition is satisfied, a set of geographic locations of the device,
wherein the set of geographic locations are determined periodically;
receive a set of altitude values that identify a set of altitudes that correspond to the set of geographic locations;
determine a set of measured barometric pressures that correspond to the set of geographic locations;
determine a set of expected barometric pressures that correspond to the set of geographic locations,
wherein the set of expected barometric pressures are determined based on a reference altitude associated with a reference location, a set of reference barometric pressures associated with the reference location, and the set of altitudes that correspond to the set of geographic locations,
determine a barometric pressure bias that is based on respective differences between at least a subset of the set of expected barometric pressures and a corresponding subset of the set of measured barometric pressures; and perform one or more actions based on the barometric pressure bias.

16. The non-transitory computer-readable medium of claim 15, wherein the one or more instructions, when executed by the one or more processors, further cause the one or more processors to:
   determine, before determining the barometric pressure bias, that the subset of the set of expected barometric pressures and the corresponding subset of the set of measured barometric pressures satisfy a threshold pressure differential;
   identify the subset and the corresponding subset as pressures that are to be used for determining the barometric pressure bias based on the subset and the corresponding subset satisfying the threshold pressure differential; and
   wherein the one or more instructions, that cause the one or more processors to determine the barometric pressure bias, cause the one or more processors to:
      determine the barometric pressure bias based on the subset of the set of expected barometric pressures and the corresponding subset of the set of measured barometric pressures.

17. The non-transitory computer-readable medium of claim 15, wherein the trigger condition includes at least one of:
   a first trigger condition that is satisfied based on a speed of the device satisfying a threshold speed, or
   a second trigger condition that is satisfied based on a user submitting a request.

18. The non-transitory computer-readable medium of claim 15, wherein the one or more instructions, that cause the one or more processors to determine an adjusted expected barometric pressure that is part of the set of expected barometric pressures, cause the one or more processors to:
   determine a difference between an altitude for a particular geographic location, of the set of geographic locations, and the reference altitude,
   multiply the difference by a ratio between a pressure difference and an altitude difference,
   add a particular reference barometric pressure, of the one or more reference barometric pressures, and a first output of multiplying the difference by the ratio between the pressure difference and the altitude difference,
   determine an average expected barometric pressure between the particular geographic location and one or more other particular geographic locations that correspond to one or more previously determined expected barometric pressures, and
   determine the adjusted expected barometric pressure by adding the average expected barometric pressure and a second output that represents a sum of the particular reference barometric pressure and the first output.

19. The non-transitory computer-readable medium of claim 15, wherein the one or more instructions, that cause the one or more processors to perform the one or more actions, cause the one or more processors to:
   determine a new measured barometric pressure for a new geographic location,
   determine an adjusted measured barometric pressure based on the new measured barometric pressure and the barometric pressure bias,
   determine, based on the new geographic location of the device and the adjusted measured barometric pressure, a height of the device,
   determine, based on the new geographic location and the height, a floor that the device is located on in a structure associated with the new geographic location, and
   perform one or more additional actions after determining the floor that the device is located on in the structure.

20. The non-transitory computer-readable medium of claim 15, wherein the one or more instructions, that cause the one or more processors to perform the one or more actions, cause the one or more processors to:
   recalibrate a pressure sensor of the device based on the barometric pressure bias.

* * * * *